United States Patent
Tatsuno et al.

(10) Patent No.: US 9,705,137 B2
(45) Date of Patent: Jul. 11, 2017

(54) POROUS ELECTRODE SUBSTRATE, METHOD FOR MANUFACTURING SAME, PRECURSOR SHEET, MEMBRANE ELECTRODE ASSEMBLY, AND POLYMER ELECTROLYTE FUEL CELL

(75) Inventors: Hiroto Tatsuno, Aichi (JP); Kazuhiro Sumioka, Aichi (JP); Tadao Samejima, Aichi (JP)

(73) Assignee: MITSUBISHI RAYON CO., LTD., Tokyo (JP)

( * ) Notice: Subject to any disclaimer, the term of this patent is extended or adjusted under 35 U.S.C. 154(b) by 498 days.

(21) Appl. No.: 13/982,061

(22) PCT Filed: Jan. 20, 2012

(86) PCT No.: PCT/JP2012/051177
§ 371 (c)(1),
(2), (4) Date: Jul. 26, 2013

(87) PCT Pub. No.: WO2012/102195
PCT Pub. Date: Aug. 2, 2012

(65) Prior Publication Data
US 2013/0323620 A1    Dec. 5, 2013

(30) Foreign Application Priority Data

Jan. 27, 2011  (JP) .................................. 2011-015638
Jan. 27, 2011  (JP) .................................. 2011-015639
Mar. 24, 2011  (JP) .................................. 2011-066344

(51) Int. Cl.
| | |
|---|---|
| *H01M 4/86* | (2006.01) |
| *H01M 4/88* | (2006.01) |
| *H01M 4/96* | (2006.01) |
| *D21H 13/50* | (2006.01) |
| *D21H 17/46* | (2006.01) |
| *D21H 19/24* | (2006.01) |
| *D21H 25/06* | (2006.01) |
| *H01M 8/0234* | (2016.01) |
| *H01M 8/1018* | (2016.01) |

(52) U.S. Cl.
CPC .......... *H01M 4/8885* (2013.01); *D21H 13/50* (2013.01); *D21H 17/46* (2013.01); *D21H 19/24* (2013.01); *D21H 25/06* (2013.01); *H01M 4/8605* (2013.01); *H01M 4/8652* (2013.01); *H01M 4/8807* (2013.01); *H01M 4/8875* (2013.01); *H01M 4/96* (2013.01); *H01M 8/0234* (2013.01); *H01M 2008/1095* (2013.01); *Y02P 70/56* (2015.11)

(58) Field of Classification Search
CPC ............. H01M 4/8605; H01M 4/8652; H01M 4/8875; H01M 4/8885; H01M 4/96; H01M 4/8807; H01M 8/0234; H01M 2008/1095; Y02E 60/521; Y02E 60/50; Y02P 70/56; D21H 13/50; D21H 19/24; D21H 25/06; D21H 17/46
See application file for complete search history.

(56) References Cited

U.S. PATENT DOCUMENTS

| | | | |
|---|---|---|---|
| 4,985,316 A | 1/1991 | Bose et al. | |
| 5,026,402 A | 6/1991 | Bose et al. | |
| 6,713,034 B2 | 3/2004 | Nakamura et al. | |
| 6,812,171 B2 | 11/2004 | Shimazaki et al. | |
| 7,297,445 B2 | 11/2007 | Nakamura et al. | |
| 7,959,750 B2 | 6/2011 | Nishida et al. | |
| 8,343,452 B2 | 1/2013 | Ji et al. | |
| 2002/0029842 A1 | 3/2002 | Nishida et al. | |
| 2002/0175073 A1 | 11/2002 | Nakamura et al. | |

(Continued)

FOREIGN PATENT DOCUMENTS

| | | |
|---|---|---|
| EP | 0 328 135 A2 | 8/1989 |
| EP | 1 139 471 | † 10/2001 |

(Continued)

OTHER PUBLICATIONS

International Search Report Issued Apr. 24, 2012 in PCT/Jp12/051177 Filed Jan. 27, 2011.
U.S. Appl. No. 13/980,774, filed Jul. 19, 2013, Sumioka, et al.
Rejection Notice issued Aug. 20, 2013 in Japanese Patent Application No. 2012-504215 (with partial English translation).
U.S. Appl. No. 14/740,637, filed Jun. 16, 2015, Sumioka, et al.
Partial Supplementary Search Report issued Jan. 27, 2016 in European Patent Application No. 12739680.2.
Combined Office Action and Search Report issued Jan. 14, 2015 in Taiwanese Patent Application No. 101102527 (with partial English language translation and English Translation of Category of Cited Documents).

(Continued)

*Primary Examiner* — Muhammad Siddiquee
(74) *Attorney, Agent, or Firm* — Oblon, McClelland, Maier & Neustadt, L.L.P.

(57) ABSTRACT

According to the present invention, a porous electrode substrate with greater sheet strength, lower production cost, and excellent gas permeability and conductivity as well as its manufacturing method are provided. Also provided are a precursor sheet for forming such a substrate, and a membrane electrode assembly and a polymer electrolyte fuel cell containing such a substrate. The method for manufacturing such a porous electrode substrate includes the following steps [1]~[3]: [1] a step for manufacturing a sheet material in which short carbon fibers (A) are dispersed; [2] a step for manufacturing a precursor sheet by adding a water-soluble phenolic resin and/or water-dispersible phenolic resin to the sheet material; and [3] a step for carbonizing the precursor sheet at a temperature of 1000° C. or higher. The present invention also relates to a porous electrode substrate obtained by such a manufacturing method as well as a precursor sheet to be used for manufacturing the substrate, a membrane electrode assembly and a polymer electrolyte fuel cell.

16 Claims, 2 Drawing Sheets

(56) References Cited

U.S. PATENT DOCUMENTS

| | | | |
|---|---|---|---|
| 2003/0194557 A1* | 10/2003 | Wilde | D21H 13/50 428/408 |
| 2004/0227265 A1 | 11/2004 | Nishida et al. | |
| 2005/0150620 A1* | 7/2005 | Hamada | D21H 13/50 162/152 |
| 2007/0166524 A1 | 7/2007 | Nakamura et al. | |
| 2008/0268297 A1 | 10/2008 | Quayle et al. | |
| 2011/0226431 A1 | 9/2011 | Nishida et al. | |
| 2012/0100456 A1 | 4/2012 | Sumioka et al. | |

FOREIGN PATENT DOCUMENTS

| | | | |
|---|---|---|---|
| EP | 1139471 A † | 10/2001 | |
| EP | 1 788 651 A1 | 5/2007 | |
| EP | 1 939 156 A1 | 7/2008 | |
| JP | 60 59660 | 4/1985 | |
| JP | 60-122711 † | 7/1985 | |
| JP | 60-122711 A † | 7/1985 | |
| JP | 62 154470 | 7/1987 | |
| JP | 1 253164 | 10/1989 | |
| JP | 11 43890 | 2/1999 | |
| JP | 2001-240477 | 9/2001 | |
| JP | 2002-266217 | 9/2002 | |
| JP | 2002-327355 | 11/2002 | |
| JP | 2003-151568 | 5/2003 | |
| JP | 2003-213563 | 7/2003 | |
| JP | 2003 286085 | 10/2003 | |
| JP | 2004 100102 | 4/2004 | |
| JP | 2004-134108 | 4/2004 | |
| JP | 2004-288489 | 10/2004 | |
| JP | 2004-296176 | 10/2004 | |
| JP | 2004 307815 | 11/2004 | |
| JP | 2004-307815 | 11/2004 | |
| JP | 2004-311431 | 11/2004 | |
| JP | 2005-116338 | 4/2005 | |
| JP | 2005-240224 | 9/2005 | |
| JP | 3699447 | 9/2005 | |
| JP | 2005-281871 | 10/2005 | |
| JP | 2005 299069 | 10/2005 | |
| JP | 2005-317240 | 11/2005 | |
| JP | 2006-40886 A | 2/2006 | |
| JP | 2006-56960 | 3/2006 | |
| JP | 2006 56960 | 3/2006 | |
| JP | 2006-143478 | 6/2006 | |
| JP | 2007 115574 | 5/2007 | |
| JP | 2007 173009 | 7/2007 | |
| JP | 2007 244997 | 9/2007 | |
| JP | 2007-244997 | 9/2007 | |
| JP | 2007 273466 | 10/2007 | |
| JP | 2008-503043 | 1/2008 | |
| JP | 2009 84382 | 4/2009 | |
| JP | 2009-84382 | 4/2009 | |
| JP | 2009-144316 | 7/2009 | |
| JP | 2009-238748 | 10/2009 | |
| JP | 2009 283259 | 12/2009 | |
| JP | 2010-257748 | 11/2010 | |
| JP | 2011-258395 | 12/2011 | |
| TW | 200306376 A | 11/2003 | |
| TW | 200727527 A | 7/2007 | |
| WO | 0122509 A † | 3/2001 | |
| WO | WO 01/22509 † | 3/2001 | |
| WO | WO 01/22509 A1 | 3/2001 | |
| WO | 01 56103 | 8/2001 | |
| WO | 02 42534 | 5/2002 | |
| WO | WO 2005/124902 | 12/2005 | |
| WO | 2011 004853 | 1/2011 | |
| WO | WO 2012/102195 | 8/2012 | |

OTHER PUBLICATIONS

International Search Report Issued Jul. 2, 2013 in PCT/JP13/059565 Filed Mar. 29, 2013.
Notification issued Sep. 24, 2014 in Japanese Patent Application No. 2013-218365 (with partial English translation).
U.S. Appl. No. 14/382,723, filed Sep. 3, 2014, Tatsuno.
Office Action issued on Dec. 9, 2014 in the corresponding Japanese Patent Application No. 2013-218365 (with Partial English Translation).
Office Action issued Apr. 6, 2016 in Japanese Patent Application No. 2015-018392 (with English translation).
Office Action issued Feb. 27, 2017 in European patent application No. 12 739 680.2.

\* cited by examiner
† cited by third party

20 μm

POROUS ELECTRODE SUBSTRATE, METHOD FOR MANUFACTURING SAME, PRECURSOR SHEET, MEMBRANE ELECTRODE ASSEMBLY, AND POLYMER ELECTROLYTE FUEL CELL

TECHNICAL FIELD

The present invention relates to a porous electrode substrate to be used in a fuel cell, its manufacturing method, a precursor sheet for producing such a porous electrode substrate, and a membrane electrode assembly and a polymer electrolyte fuel cell containing such a porous electrode substrate.

BACKGROUND ART

To increase mechanical strength, a gas-diffusion electrode substrate in a fuel cell conventionally uses a porous electrode substrate, which is a sheet-type carbon-carbon composite made by forming short carbon fibers into a sheet, binding the fibers to each other with an organic polymer and then sintering at high temperatures to carbonize the organic polymer (see patent publication 1).

Also, a porous electrode substrate, formed by forming a sheet from short oxidized fibers and sintering the sheet at high temperatures to carbonize the short oxidized fibers, is proposed to reduce costs (see patent publication 2).

Moreover, a porous electrode substrate, formed by making a sheet using short carbon fibers and acrylic pulp and sintering the sheet at high temperatures to carbonize the acrylic pulp, is proposed to reduce costs (see patent publication 3).

PRIOR ART PUBLICATION

Patent Publication

Patent publication 1: International Patent Publication Pamphlet 2001/056103
Patent publication 2: International Patent Publication Pamphlet 2002/042534
Patent publication 3: Japanese Laid-Open Patent Publication 2007-273466

SUMMARY OF THE INVENTION

Problem(s) to be Solved by the Invention

However, according to the method in patent publication 1, the manufacturing process tends to be complex and the costs may be high. Also, according to the method in patent publication 2, the costs are reduced, but contraction during sintering may be significant, thus causing uneven thickness in the obtained porous electrode substrate or increased undulation of the sheet. Moreover, according to the method in patent publication 3, carbon fibers and acrylic pulp may not entangle well with each other during sheet formation, causing difficulty in handling. Also, compared with fibrous material, since hardly any molecular orientation of polymers is observed in acrylic pulp, its carbonization rate tends to be low during carbonization treatment. Thus, to enhance handling, much acrylic pulp needs to be added.

The present invention was carried out in consideration of problems described above. The objective is to provide a porous electrode substrate and its manufacturing method so that greater sheet strength, lower production costs, and excellent gas permeability and conductivity are achieved. Another objective is to provide a precursor sheet for producing such a porous electrode substrate along with a membrane electrode assembly and a polymer electrolyte fuel cell that contain such a porous electrode substrate.

Solution(s) to the Problem(s)

The inventors of the present invention have found that the problems described above are solved by the following (1)~(19) according to the embodiments of the present invention.

(1) A method for manufacturing a porous electrode substrate including following steps [1]~[3]:
[1] a step for manufacturing a sheet material in which short carbon fibers (A) are dispersed;
[2] a step for manufacturing a precursor sheet by adding a water-soluble phenolic resin and/or a water-dispersible phenolic resin to the sheet material; and
[3] a step for carbonizing the precursor sheet at a temperature of 1000° C. or higher.

(2) The manufacturing method described in (1) above includes a step [4] for performing entanglement treatment on the sheet material to be conducted between the steps [1] and [2].

(3) The manufacturing method described in (1) above includes a step [7] for drying the sheet material to be conducted between the steps [1] and [2].

(4) In the manufacturing method described in (2) above, the step [7] for drying the sheet material is conducted between the steps [1] and [4] and/or between the steps [4] and [2].

(5) In the manufacturing method described in any one of (1)~(4) above, the step [1] is a step for manufacturing a sheet material in which short carbon fibers (A) along with carbon fiber precursor short fibers (b1) and/or fibrillar fibers (b2) are dispersed.

(6) The manufacturing method described in any one of (1)~(5) above includes a step [5] for hot pressing the precursor sheet at a temperature of 100° C. or higher but 250° C. or lower to be conducted between the steps [2] and [3].

(7) The manufacturing method described in (6) above includes a step [6] for drying the precursor sheet to be conducted between the steps [2] and [5].

(8) In the manufacturing method described in any one of (1)~(7) above, a sheet material obtained in the step [1] contains a water-soluble binder, and the amount of the water-soluble binder in the sheet material obtained in the step [1] is 10 g/m² or less.

(9) In the manufacturing method described in any one of (1)~(8) above, the step [2] is a step for manufacturing a precursor sheet by adding a water-soluble phenolic resin and/or water-dispersible phenolic resin to a sheet material supplied to the step [2] by spraying, dripping or flowing.

(10) A porous electrode substrate manufactured by a method described in any one of (1)~(9) above.

(11) A porous electrode substrate having a structure where short carbon fibers (A) are bonded by resin carbide (C) derived from a water-soluble phenolic resin and/or water-dispersible phenolic resin.

(12) A porous electrode substrate having a structure where short carbon fibers (A) are bonded by carbon fibers (B) derived from carbon fiber precursor short fibers (b1) and/or fibrillar fibers (b2), and by resin carbide (C) derived from a water-soluble phenolic resin and/or water-dispersible phenolic resin, and the short carbon fibers (A) form a three-dimensionally entangled structure in the porous electrode substrate.

(13) A porous electrode substrate having a structure where short carbon fibers (A) are bonded by a carbide, the bulk density is set at 0.20 g/cm³ or greater but 0.45 g/cm³ or less, and the thickness at 3 MPa pressure is set at 30% or greater but 70% or less of the thickness at 0.05 MPa pressure.

(14) A porous electrode substrate having a structure where short carbon fibers (A) are bonded by a carbide, the bulk density is set at 0.20 g/cm³ or greater but 0.45 g/cm³ or less, the thickness at 3 MPa pressure is set at 30% or greater but 70% or less of the initial thickness at 0.05 MPa pressure, and the thickness after being pressed at 3 MPa and decompressed to 0.05 MPa is 60% or greater but 98% or less of the initial thickness.

(15) In a porous electrode substrate described in (12) above, the bulk density is set at 0.20 g/cm³ or greater but 0.45 g/cm³ or less, and the thickness at 3 MPa pressure is set at 30% or greater but 70% or less of the thickness at 0.05 MPa pressure.

(16) In a porous electrode substrate described in (12) above, the bulk density is set at 0.20 g/cm³ or greater but 0.45 g/cm³ or less, the thickness at 3 MPa pressure is set at 30% or greater but 70% or less of the initial thickness at 0.05 MPa pressure, and the thickness after being pressed at 3 MPa and decompressed to 0.05 MPa is 60% or greater but 98% or less of the initial thickness.

(17) In a precursor sheet for a porous electrode substrate containing short carbon fibers (A) and phenolic resin, the amount of sodium is 150 mg/m² or less.

(18) A membrane-electrode assembly containing a porous electrode substrate described in any one of (10)~(16) above.

(19) A solid polymer electrolyte fuel cell containing the membrane-electrode assembly described in (18) above.

Effect(s) of the Invention

According to the present invention, a porous electrode substrate and its manufacturing method are provided, having greater sheet strength, lower production costs, and excellent gas permeability and conductivity. Also provided are a precursor sheet for producing such a porous electrode substrate along with a membrane electrode assembly and a polymer electrolyte fuel cell that contain such a porous electrode substrate.

MODE TO CARRY OUT THE INVENTION

<<Method for Manufacturing Porous Electrode Substrate>>

Figure 1:
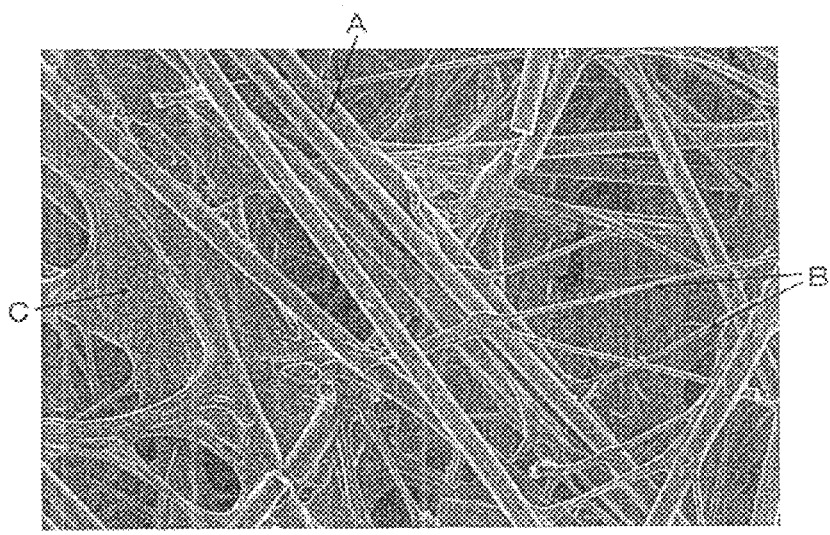
FIG. 1 a photograph taken by a scanning electron microscope showing a surface of a porous electrode substrate according to an embodiment of the present invention.

A manufacturing method related to the present invention includes the following steps [1]~[3].

[1] A step for manufacturing a sheet material in which short carbon fibers (A) are dispersed (sheet material manufacturing step [1]).

[2] A step for manufacturing a precursor sheet by adding a water-soluble phenolic resin and/or a water-dispersible phenolic resin into the sheet material (resin adding step [2]).

[3] A step for carbonizing the precursor sheet at a temperature of 1000° C. or higher (carbonization step [3]).

Step [4] for entanglement of the sheet (entanglement step [4]) may be included between steps [1] and [2] above.

When step [1] above is set for manufacturing a sheet material in which short carbon fibers (A) and fibrillar fibers (b2) are dispersed, or when step [4] is included for conducting entanglement treatment on a sheet material with dispersed short carbon fibers (A) between steps [1] and [2] above, it helps short carbon fibers (A) open to become single fibers and enhances the strength of the precursor sheet.

Also, step [7] for drying a sheet material may be included between steps [1] and [2] above. The sheet material here indicates a sheet material in which at least short carbon fibers (A) are dispersed (later-described fiber precursor (b) may also be dispersed therein). Moreover, when the manufacturing method according to an embodiment of the present invention includes step [4], step [7] for drying the sheet material may be included between steps [1] and [4] above and/or steps [4] and [2] above. When step [7] is conducted between steps [1] and [4], the sheet material indicates a sheet material in which at least short carbon fibers (A) are dispersed (later-described fiber precursor (b) may also be dispersed therein), whereas when step [7] is conducted between steps [4] and [2], it indicates a sheet material on which entanglement treatment has been performed.

In addition, between steps [2] and [3] above, step [5] (hot-pressing step [5]) may be included for hot pressing the precursor sheet at a temperature of 100° C. or higher but 250° C. or lower.

Furthermore, between steps [2] and [5] above, step [6] (drying step [6]) may be included for drying the precursor sheet.

<Step [1] for Manufacturing Sheet Material>

A sheet material is manufactured by a wet sheet-forming method for dispersing short carbon fibers (A) in a liquid medium, or by a dry sheet-forming method for dispersing short carbon fibers (A) in the air and piling them. Considering sheet strength and homogeneous features of dispersed fibers, a wet method is preferable.

In addition, it is an option to disperse fiber precursor (b) along with short carbon fibers (A). When short carbon fibers (A) and fiber precursor (b) are entangled with each other, the strength of a sheet material improves, and the sheet may actually be formed without a binder. Namely, a sheet material may be made of short carbon fibers (A) or made of short carbon fibers (A) and fiber precursor (b). Fiber precursor (b) indicates carbon fiber precursor short fibers (b1) and/or fibrillar fibers (b2).

Also, in an embodiment of the present invention, a small amount of an organic polymer compound may be used as a binder for those sheet materials. The method for adding a binder to a sheet material is not limited specifically. For example, a binder may be dispersed simultaneously with short carbon fibers (A) and fiber precursor (b). Alternatively, after a sheet material containing short carbon fibers (A) is formed, a binder may be added to the sheet material.

An organic polymer compound for a binder is not limited specifically. For example, water-soluble binders such as polyvinyl alcohol (PVA), or heat-sealing polyester-based or polyolefin-based binders may be used. Binders may be solid such as fibers or particles, or may be liquid. Since fibrous PVA is often manufactured using a spinning bath containing sodium sulfate, it generally includes a large amount of sodium as an element. When a binder having a large amount of sodium is used, the sodium remains in a sheet material and a precursor sheet, but will be discharged from the sheet in subsequent carbonization step [3]. The discharged sodium scatters in a carbonization furnace and may damage the furnace. Thus, the smaller the amount of sodium in a sheet material or a precursor sheet, the better it is. To protect a furnace, the amount of a binder in a sheet material (a water-soluble binder, for example) is preferred to be 10 g/m² or less, more preferably 5 g/m² or less, even more preferably 1 g/m². Other than PVA, polyacrylic acid, carboxymethylcellulose or the like may also be used as a water-soluble binder.

As a medium for dispersing fibrous material such as short carbon fibers (A) and fiber precursor (b), a medium such as water or alcohol which does not dissolve fibrous materials, for example, is used. Among those, water is preferred from a viewpoint of productivity.

Sheet material is manufactured either by a continuous method or by a batch method. However, a continuous method is preferred, considering the productivity and mechanical strength of sheet material. The basis weight of sheet material is preferred to be approximately 10~200 g/m², and the thickness of sheet material is preferred to be approximately 20~400 μm.

<Step [2] for Adding Resin>

The method for manufacturing a precursor sheet by adding a water-dispersible phenolic resin and/or a water-soluble phenolic resin to a sheet material is not limited specifically as long as such phenolic resin is incorporated into a sheet material. In the following, water-dispersible phenolic resin and/or water-soluble phenolic resin may be referred to as phenolic resin (c) or resin (c).

For example, methods such as coating phenolic resin (c) uniformly on a surface of a sheet material using a coater or impregnation methods may be used.

Alternatively, phenolic resin (c) may be discharged (sprayed, dripped or flowed) to be applied on a sheet material. For example, a method in which a spray nozzle is used to spray or drip resin (c) on a surface of a sheet material, a method in which a discharge-type coater such as a curtain coater is used to flow resin (c) along a surface of a sheet material for uniformly coating the surface, or the like may be employed. The method for supplying a solution or a dispersion containing phenolic resin (c) is not limited specifically. For example, compressed feeding by a compressor tank, feeding by a metering pump, suction methods using self-suction force or the like may be used.

A two-fluid nozzle having separate channels for liquid and gas is preferred for a spray nozzle, because channels are less likely to be clogged, and thus maintenance is easier. As for such nozzles, double-tube nozzles, vortex-flow atomization nozzles shown in Japanese laid-open patent publication 2007-244997, or the like may be used. The gas used for spraying purposes is not limited specifically as long as it does not react with phenolic resin (c) or does not facilitate curing of phenolic resin (c). Usually, compressed air is preferred.

As for drip nozzles, needle-tube nozzles generally known as drip needles, above-described spray nozzles, and high-pressure liquid injection nozzles may be used.

To homogeneously infiltrate discharged resin (c) into sheet material, or to remove excess resin (c), a squeezer (nip device) may also be used at the same time. Instead of nipping, after resin (c) is discharged (sprayed, for example), resin (c) may be infiltrated into sheet material by spraying gas on a surface of the sheet material or by suctioning the discharged resin from a lower surface of the sheet material. After resin (c) is added, the sheet may be dried.

Adding resin (c) may be repeated multiple times. Namely, after resin (c) is added and the dispersant is dried, resin (c) may further be added. Alternatively, during the process of adding resin (c) to a sheet, the sheet (precursor sheet) is inverted and the process of adding resin (c) may resume from the opposite side. In addition, such procedures may be repeated. The number of times to add resin (c) is not limited, but the number is preferred to be smaller to reduce production costs. When the resin is added multiple times, it is an option to use the same type of phenolic resin (c) or to use a type with a different resin composition or concentration. Also, the added amount of resin (c) may be uniform in a thickness direction of the sheet material, or the concentration may differ.

Considering the mechanical strength of a porous electrode substrate, the solid content of phenolic resin (c) above is preferred to be 20 parts by mass or greater based on 100 parts by mass of a sheet material (solid content), and from the viewpoint of gas permeability of the porous electrode substrate, it is preferred to be 150 parts by mass or less, more preferably 20~120 parts by mass.

<Step [3] for Carbonization>

As for a method for carbonizing a precursor sheet, any method is employed as long as carbonization is conducted at temperatures continuously rising from room temperature. Carbonization is conducted at 1000° C. or higher. To provide excellent conductivity, carbonization is preferred to be performed under inert atmosphere in a temperature range of 1000° C. or higher and 2400° C. or lower. Prior to carbonization treatment, it is an option to perform pre-carbonization treatment under inert atmosphere in a temperature range of 300° C. or higher but lower than 1000° C. By performing pre-carbonization treatment, it is easier to completely remove gases generated by decomposition at an early stage of carbonization, and to suppress decomposed substances from adhering to and depositing onto the inner walls of a carbonization furnace.

When carbonizing precursor sheets manufactured continuously, the entire length of precursor sheets is preferred to be continuously carbonized to reduce production costs. Porous electrode substrates formed in one long sheet would increase the productivity of themselves, and subsequent MEAs (membrane electrode assemblies) can also be manufactured continuously, leading to reduced production costs of fuel cells. In addition, it is preferred to roll up porous electrode substrates continuously as they are manufactured, considering the productivity and production costs of porous electrode substrates and fuel cells.

<Step [4] for Entanglement Treatment>

By performing entanglement treatment on a sheet material, the sheet will have an entangled structure where short carbon fibers (A) are entangled three dimensionally (entangled-structure sheet). When fiber precursor (b) is also dispersed along with carbon fibers (A) in sheet material manufacturing step [1], a sheet is formed where short carbon fibers (A) and fiber precursor (b) are three-dimensionally entangled (entangled-structure sheet) by performing entanglement treatment on the sheet material.

Entanglement treatment is not limited to any specific method, and may be selected from those for forming entanglement structures. For example, mechanical entanglement methods such as needle punching, high-pressure liquid jetting such as water-jet punching, or high-pressure gas jetting such as steam-jet punching, or a combination thereof, may be used. High-pressure liquid jetting is preferred since it is easier to suppress breakage of short carbon fibers (A) during entanglement treatment and to obtain an appropriate entangled structure. The method is described in detail in the following.

High-pressure liquid jetting is conducted as follows: sheet material is placed on a support with a substantially smooth surface, and liquid column flow, liquid fan flow, liquid slit flow or the like is injected at a pressure of 1 MPa or greater to entangle short carbon fibers (A) in the sheet material. When fiber precursor (b) is also dispersed along with short carbon fibers (A) in step [1] for manufacturing a sheet material, short carbon fibers (A) and fiber precursor (b) are entangled. Here, a support with a substantially smooth surface is selected as desired so that the pattern of the support will not be transferred onto the entangled body and the injected liquid will be removed promptly. Specific examples are a screen, plastic net or roll with a 30~200 mesh.

Considering production costs, it is preferred to manufacture sheet materials on a support with a substantially smooth surface, followed by continuous entanglement treatment using high-pressure liquid jetting or the like.

Entanglement treatment on a sheet material using high-pressure liquid jetting may be repeated multiple times. Namely, after high-pressure liquid jetting was performed on a sheet material, another sheet material is laminated and treated by high-pressure liquid jetting. Alternatively, the sheet material (entangled-structure sheet material) is inverted during the process and high-pressure liquid jetting is performed from the opposite side. Such treatment may also be repeated.

The liquid used for high-pressure liquid jetting is not limited specifically as long as it is a medium that does not dissolve the fibers to be treated. Usually, water is preferred. The water may be warm. The hole diameter of each high-pressure liquid jetting nozzle is preferred to be 0.06~4.0 mm, more preferably 0.1~0.3 mm, if it makes columnar flow. The distance between jetting nozzle holes and the sheet materials is preferred to be 0.5~5 cm. The liquid pressure is preferred to be 1 MPa or greater, more preferably 1.5 MPa or greater, considering enough entanglement of the fibers. Entanglement treatment is performed in a single row or multiple rows. When multiple rows are employed, it is effective to increase the pressure of high-pressure liquid jetting from the first row to the second and subsequent rows to maintain the shape of the sheet material.

When sheet materials with an entangled structure are continuously manufactured, striped patterns caused by uneven fiber density in the sheets may be formed in a lengthwise direction of the sheets. However, if a high-pressure liquid jetting nozzle with nozzle holes arrayed in a single row or multiple rows is oscillated in a crosswise direction of the sheets, it is easier to suppress such striped patterns. When striped patterns are suppressed from occurring in a lengthwise direction of the sheets, the tensile strength of the sheets is expressed in a crosswise direction. When using multiple high-pressure liquid jetting nozzles with nozzle holes arrayed in a single row or multiple rows, periodic patterns appearing on precursor sheets with an entangled structure may be suppressed by controlling the frequency or phase differences of oscillation of high-pressure liquid jetting nozzles in a crosswise direction of the sheets.

Since the tensile strength of the sheet improves by entanglement treatment, it is not necessary to use a binder, such as polyvinyl alcohol, which is usually added in the sheet-forming process. Also, the tensile strength of a sheet is maintained in water or in a humid situation, allowing continuous addition of phenolic resin (c) to the entangled-structure sheet. Moreover, since using phenolic resin (c) omits the process of collecting organic solvent, the manufacturing facility is simplified compared with conventional ones, and production costs are reduced.

<Step [5] for Hot Pressing>

To reduce uneven thickness of a porous electrode substrate, to suppress fuzz near the surface of fibers that have become fuzzy during entanglement treatment, and to suppress short circuiting and gas leakage when the sheet is installed in a fuel cell, the precursor sheet is preferred to be hot pressed at a temperature of 100° C. or higher but 250° C. or lower.

When fiber precursor (b) is dispersed along with carbon fibers (A) in step [1] for manufacturing a sheet material, step [5] for hot pressing also has an effect of fusion-bonding short carbon fibers (A) by fiber precursor (b).

For hot-pressing methods, any technology may be employed as long as the precursor sheet is evenly hot pressed. For example, the precursor sheet may be hot pressed by applying smooth steel plates to both surfaces of the precursor sheet, or using a hot-roll pressing apparatus, a continuous belt pressing apparatus or the like. When hot pressing precursor sheets manufactured continuously, a hot-roll pressing or continuous-belt pressing apparatus is preferred. Accordingly, step [3] for carbonization described above can be performed continuously.

The temperature for hot pressing is preferred to be 120~190° C. to effectively make smooth surfaces of a precursor sheet. The duration of hot pressing is 30 seconds to 10 minutes, for example.

The pressure for hot pressing is not limited specifically. When the ratio of short carbon fibers (A) is low in a precursor sheet (for example, 15% by mass or greater, 50% by mass or lower), it is easier to make the surfaces of a precursor sheet smooth at lower pressure. The pressure for hot pressing is preferred to be 20 kPa-10 MPa. If the pressure is 10 MPa or lower, it is easier to prevent breakage in short carbon fibers (A) during hot pressing, and to provide an appropriate density for a porous electrode substrate. If the pressure is 20 kPa or higher, making smooth surfaces is easier.

When a precursor sheet is hot pressed by being sandwiched between two steel plates, or by using a hot-roll pressing or continuous belt pressing apparatus, it is preferred to apply a release agent, or to sandwich release paper between the precursor sheet and the steel plate, roller or belt so that fibrous matters do not adhere to the steel plates, roller or belt.

<Step [6] for Drying Treatment>

The manufacturing method of the present embodiment may further include step [6] for drying a precursor sheet between steps [2] and [5]. Including such a step is preferred, since it is easier to reduce the energy for removing a dispersant and unreacted monomers in step [5].

During that time, it is preferred to dry a precursor sheet at a temperature of 20~100° C. to remove a dispersant and unreacted monomers from the precursor sheet. The duration for drying is from 1 minute to 24 hours, for example.

The method for drying treatment is not limited specifically, and heat treatment using a hot air furnace or far-infrared furnace, or direct heating treatment using hot plates or hot rollers may be employed. To suppress phenolic resin (c) from adhering to a heat source, it is preferred to perform dry treatment using a hot air furnace or far-infrared furnace. When drying the precursor sheets manufactured continuously, the entire length of precursor sheets is preferred to be dried continuously to reduce production costs. By doing so, hot-pressing step [5] is performed continuously after step [6].

<Step [7] for Drying Sheet Material>

The manufacturing method of the present embodiment may include step [7] for drying a sheet material between steps [1] and [2]. Also, when the manufacturing method of the present embodiment includes step [4], step [7] for drying a sheet material may further be included between steps [1] and [4] and/or between steps [4] and [2]. When drying step [7] is performed between steps [4] and [2], such drying treatment is conducted on a sheet material after entanglement treatment (entangled-structure sheet). In embodiments of the present invention, sheet material does not include a precursor sheet.

To remove a dispersant from a sheet material to be dried, the sheet material is preferred to be dried at 20~200° C. in any drying step [7]. The duration for drying is from 1 minute to 24 hours, for example.

As for drying, it is not limited to any specific method. Complete dewatering using a dewatering apparatus under reduced pressure is employed when drying step [7] is performed between steps [1] and [2] or steps [1] and [4], for example. When drying step [7] is performed between steps [4] and [2], heating treatment using a hot air furnace or far-infrared furnace, or direct heating treatment using hot plates or hot rollers may be employed. When drying step [7] is performed between steps [4] and [2], drying treatment using a hot air furnace or far-infrared furnace is preferred because fibers from the entangled-structure sheet are suppressed from adhering to a heat source. Considering production costs, if sheet materials are continuously manufactured, it is preferred to dry them continuously on the entire length of sheet materials. By doing so, step [7] for drying sheet materials is continuously performed after steps [1] and [4].

<Short Carbon Fibers (A)>

Short carbon fibers (A), one of the fibers that form a porous electrode substrate, are entangled in a thickness direction of a sheet material, a precursor sheet and a porous electrode substrate. As for short carbon fibers (A), carbon fibers cut to an appropriate length of polyacrylonitrile-based carbon fibers (hereinafter referred to as "PAN-based carbon fibers"), pitch-based carbon fibers, rayon-based carbon fibers and the like may be used. Considering the mechanical strength of a porous electrode substrate, PAN-based carbon fibers are preferable.

The average fiber length of short carbon fibers (A) is preferred to be 2~12 mm considering dispersibility. The average diameter of short carbon fibers (A) is preferred to be 3~9 μm considering production costs and dispersibility of short carbon fibers, and 4~8 μm considering smoothness of a porous electrode substrate. Average fiber lengths are measured using a commercially available fiber length measuring instrument (for example, HiRes-FQA (brand name), made by Nomura Shoji Co., Ltd.), and average fiber diameters are measured by a commercially available fiber diameter measuring instrument (for example, FDAS 765 (brand name), made by Dia-Stron Ltd.).

<Fiber Precursor (b)>

As described above, carbon fiber precursor short fibers (b1) and/or fibrillar fibers (b2) are used as fiber precursor (b) in the present embodiment.

<Carbon Fiber Precursor Short Fibers (b1)>

Carbon fiber precursor short fibers (b1) may be formed by cutting carbon fiber precursor long fibers into appropriate lengths. Carbon fiber precursor long fibers may be made from later-described polymers (acrylic polymers, for example).

The average fiber length of carbon fiber precursor short fibers (b1) is preferred to be 2~20 mm considering dispersibility. The cross-sectional shape of carbon fiber precursor short fibers (b1) is not limited specifically, but a shape closer to a perfect circle is preferred considering production costs and mechanical strength after carbonization. In addition, the average fiber diameter of carbon fiber precursor short fibers (b1) is preferred to be 5 μm or less to suppress breakage due to contraction during hot-pressing step [5] and carbonization step [3]. Also, considering spinnability, the average fiber diameter of carbon fiber precursor short fibers (b1) is preferred to be 1 μm or greater.

Regarding polymers in carbon fiber precursor short fibers (b1), the remaining amount after a carbonization step is preferred to be 20% by mass or greater to maintain the sheet shape after carbonization. A list of such polymers includes, for example, acrylic polymers, cellulose-based polymers and phenolic polymers.

Acrylic polymers used for carbon fiber precursor short fibers (b1) may be homopolymers of acrylonitrile or copolymers of acrylonitrile and another monomer. As for monomers to be copolymerized with acrylonitrile, they are not limited specifically as long as they are unsaturated monomers of generally used acrylic fibers; for example, acrylic acid esters such as methyl acrylate, ethyl acrylate, isopropyl acrylate, n-butyl acrylate, 2-ethylhexyl acrylate, 2-hydroxyethyl acrylate, and hydroxypropyl acrylate; methacrylic acid esters such as methyl methacrylate, ethyl methacrylate, isopropyl methacrylate, n-butyl methacrylate, isobutyl methacrylate, t-butyl methacrylate, n-hexyl methacrylate, cyclohexyl methacrylate, lauryl methacrylate, 2-hydroxyethyl methacrylate, hydroxypropyl methacrylate, and diethylaminoethyl methacrylate; acrylic acid, methacrylic acid, maleic acid, itaconic acid, acrylamide, N-methylolacrylamide, diacetone acrylamide, styrene, vinyl toluene, vinyl acetate, vinyl chloride, vinylidene chloride, vinylidene bromide, vinyl fluoride, and vinylidene fluoride.

Considering spinnability, capability of binding short carbon fibers (A) in a range of low to high temperatures, a greater remaining mass amount after carbonization, and fiber elasticity and fiber strength during the entanglement treatment described above, it is preferred to use acrylic polymers containing 50% by mass or greater of acrylonitrile units.

The weight-average molecular weight of an acrylonitrile-based polymer used for short carbon precursor (b1) is not limited specifically, but it is preferred to be 50000 to one million. When the weight-average molecular weight is 50000 or more, fiber spinnability is enhanced, and the yarn quality of fibers tends to be better. If the weight-average molecular weight is one million or less, the polymer density is higher so as to provide optimum viscosity for a spinning stock solution, thus enhancing productivity.

As for carbon fiber precursor short fibers (b1), it is an option to use one type, or to use two or more types of carbon fiber precursor short fibers (b1) with different fiber diameters and containing different polymers. Depending on the type of carbon fiber precursor short fibers (b1) or later-described fibrillar fibers (b2), and on the ratio to be combined with short carbon fibers (A), the remaining amount of carbon fibers (B) derived from fiber precursor (b) is adjusted in a porous electrode precursor obtained in the end. When fiber precursor (b) is used for forming a sheet material, the ratio for combining short carbon fibers (A) and fiber precursor (b)

is preferred to be determined in such a way that short carbon fibers (A) and carbonized carbon fibers (B) in a porous electrode substrate have the following ratios. Based on the sum of short carbon fibers (A) and carbon fibers (B), the amount of carbon fibers (B) in a porous electrode substrate is preferred to be 1% by mass or greater, considering the binding effect on short carbon fibers (A); and 50% by mass or lower, considering the mechanical strength of the porous electrode substrate. To make it easier to obtain a porous electrode substrate having appropriate mechanical strength and through-plane resistance, the amount of carbon fibers (B) in the porous electrode substrate is more preferred to be 4~25% by mass based on the sum of short carbon fibers (A) and carbon fibers (B).

<Fibrillar Fibers (b2)>

Fibrillar fibers (b2) are dispersed with short carbon fibers (A) and prevent short carbon fibers (A) from converging again, while setting a sheet material to be an independent sheet. Also, depending on the resin to be used (phenolic resin (c), for example), condensation water may be produced when the resin cures. Fibrillar fibers can absorb and discharge such water. Thus, it is preferred to use a resin with hydrophilic properties. A list of specific fibrillar fibers (b2) includes, for example, synthetic pulp such as fibrillar polyethylene fibers, acrylic fibers and aramid fibers. Fibrillar fibers (b2) may be those that remain as carbon after carbonization treatment, or those that do not remain as carbon after carbonization treatment.

Fibrillar fibers (b2) may be carbon fiber precursor fibers (b2-1) which have a structure where numerous fibrils with a diameter of a few μm (0.1~3 μm, for example) branch out from fibrous stems, or carbon fiber precursor short fibers (b2-2) which are fibrillated by beating splittable sea-island composite fibers. When such fibrillar carbon fiber precursor fibers are used, short carbon fibers (A) and fibrillar fibers (b2) entangle well in a precursor sheet, making it easier to obtain a precursor sheet with excellent mechanical strength. The freeness of fibrillar fibers (b2) is not limited specifically. Generally, when fibrillar fibers with lower freeness are used, the mechanical strength of a precursor sheet improves, but gas permeability of the porous electrode substrate tends to decrease. In the following, the above two types of fibrillar fibers (b2) are referred to as fibers (b2-1) and fibers (b2-2) respectively.

Fibrillar fibers (b2) may be made of one type of fibers (b2-1), or two or more types of fibers (b2-1) with different freeness degrees and fiber diameters or containing different polymers. Also, fibrillar fibers (b2) may be made of one type of fibers (b2-2), or two or more types of fibers (b2-2) with different freeness degrees and fiber diameters or containing different polymers, or may be any combination of the above.

A detailed description of fibrillar fibers (b2) is provided below.

Precursor Carbon Fibers (b2-1) with a Structure of Numerous Branched Fibrils

Regarding the polymer in fibers (b2-1), the remaining amount after carbonization is preferred to be 20% by mass or greater in order to form a structure of a porous electrode substrate together with short carbon fibers (A). A list of such polymers includes acrylic polymers, cellulose-based polymers and phenolic polymers, for example.

Acrylic polymers used for fibers (b2-1) may be the same acrylic polymers used for carbon fiber precursor short fibers (b1) described above. Among those, acrylic polymers containing 50% by mass or greater of acrylonitrile units are preferred, considering spinnability, capability of binding short carbon fibers (A) in a temperature range from low to high, a greater remaining mass amount after hot pressing and carbonization treatments, entanglement with short carbon fibers (A), and sheet strength.

The method for manufacturing fibers (b2-1) is not limited specifically, but an injection-coagulation method is preferred since it is easier to control freeness levels.

The average fiber length of fibers (b2-1) is preferred to be 0.1 mm or greater to maintain the mechanical strength of a porous electrode substrate, and 3 mm or less considering dispersibility in a precursor sheet. Also, the diameter (average fiber diameter) of fibers (b2-1) is preferred to be 0.01 μm or greater, considering dewatering when forming a precursor sheet or gas permeability of the porous electrode substrate, and 30 μm or smaller to suppress breakage caused by contraction during heat treatment.

Short Carbon Precursor (b2-2) Fibrillated Through Refining

Fibers (b2-2) may be long splittable sea-island composite fibers cut into appropriate lengths and fibrillated by beating using a refiner or pulper. Splittable sea-island composite fibers are fibrillated by beating. Long splittable sea-island composite fibers are formed using two or more types of polymers which dissolve in a common solvent but are incompatible with each other. At that time, at least one of the polymers is preferred to have a remaining amount of 20% by mass or greater in a carbonization step so that such a polymer can structure a porous electrode substrate together with short carbon fibers (A) after carbonization.

Among the polymers used in splittable sea-island composite fibers, acrylic polymers, cellulose-based polymers and phenolic polymers, for example, are those having a remaining amount of 20% by mass or greater after carbonization.

Acrylic polymers used for splittable sea-island composite fibers may be the same acrylic polymers used for carbon fiber precursor short fibers (b1) described above. Among those, acrylic polymers containing 50% by mass or greater of acrylonitrile units are preferred considering spinnability and the remaining mass amount after carbonization treatment.

The weight-average molecular weight of an acrylonitrile-based polymer used for splittable sea-island composite fibers is not limited specifically, but it is preferred to be 50000 to one million. When the weight-average molecular weight is 50000 or more, spinnability improves, and the yarn quality of fibers tends to be better. If the weight-average molecular weight is one million or less, the polymer density is higher so as to provide optimum viscosity for a spinning stock solution, thus enhancing productivity.

Regarding a splittable sea-island composite fiber, when an acrylic polymer described above is used for one of the polymers whose remaining amount is 20% by mass or greater after carbonization step [3], another polymer is preferred to be dissolved in a common solvent with the acrylic polymer and to stay stable in a spinning stock solution. Namely, the other polymer is preferred to be incompatible with the acrylonitrile-based polymer when dissolved in a common solvent with the acrylonitrile-based polymer, but to have compatibility to such a degree that it can form a sea-island structure in a spinning step. By so setting, it is easier to prevent uneven distribution of fibers in a spinning stock solution, which may occur when the degree of incompatibility is greater between two types of polymers, while preventing thread breakage in a spinning step. It is also easier to form fibers. Moreover, to prevent the other polymer from dissolving and falling into a coagulation tank and cleansing tank during wet spinning, the other polymer is preferred to be insoluble in water.

As the other polymer that satisfies the above requirements, the following, for example, may be listed: polyvinyl chloride, polyvinylidene chloride, polyvinylidene fluoride, polyvinylpyrrolidone, cellulose acetate, acrylic resin, methacrylic resin, phenolic resin and the like. Among those, cellulose acetate, acrylic resin, and methacrylic resin are preferable in terms of balancing the above requirements. The other polymer may be one type or a combination of two or more types of polymers.

Splittable sea-island composite fibers used for fibers (b2-2) may be produced using a regular wet spinning method. When one of the polymers is an acrylonitrile-based polymer whose remaining amount is 20% by mass or greater in step [3], splittable sea-island composite fibers are produced by the following method. First, the acrylonitrile-based polymer and the other polymer are mixed and then dissolved in a solvent to form a spinning stock solution of splittable sea-island composite fibers. Alternatively, a spinning stock solution obtained by dissolving an acrylonitrile-based polymer in a solvent and another spinning stock solution obtained by dissolving the other polymer in a solvent may be mixed by a static mixer or the like to make a spinning stock solution of splittable sea-island composite fibers. Organic solvent such as dimethylamide, dimethylformamide, dimethyl sulfoxide or the like is used for the above solvent. Splittable sea-island composite fibers are obtained by spinning those spinning stock solutions through a nozzle, and conducting hot wet stretching, cleansing, drying, and hot dry stretching.

The cross-sectional shape of splittable sea-island composite fibers is not limited specifically. To enhance dispersibility and to suppress breakage caused by contraction in heat treatment, the fineness of splittable sea-island composite fibers is preferred to be 1~10 dtex. The average fiber length of splittable sea-island composite fibers is preferred to be 1~20 mm considering dispersibility.

When splittable sea-island composite fibers are beaten, external mechanical force causes interfacial peeling, and at least some of the fibers are split to become fibrillated. Beating is not limited to any specific method; for example, a refiner, pulper, beater, or high-pressure water jetting (water-jet punching) may be used to fibrillate fibers.

When splittable sea-island composite fibers are refined through interfacial peeling caused by external mechanical force, the fibrillated state may vary depending on the method and duration of beating. The degree of fibrillation is evaluated based on its freeness. Freeness is obtained according to P8121 (pulp freeness testing: Canadian standard) using a Canadian Standard Freeness (CSF) tester. First, 3 grams of completely dried refined fibers are prepared and dispersed in 1000 mL of water. The dispersed solution is put into a freeness cylinder of a CSF tester, the upper cover is closed, and the air cock is closed. Next, the lower cover is opened and a measuring cylinder is positioned at the side pipe of the CSF tester, the air cock is opened and the dispersed solution is discharged. The amount of drained water in the measuring cylinder is measured and recorded. Testing is conducted twice or more, and is repeated until the difference with the average value is 2% or lower. The freeness of splittable sea-island composite fibers is not limited specifically; however, the smaller the freeness, the more likely it is that carbon fibers (B) with a three-dimensional cross-linked structure are formed. When splittable sea-island composite fibers are formed without sufficient beating and the freeness remains greater, carbon fibers (B) with a fiber structure are more likely to be formed.

The average fiber length of fibers (b2-2) is preferred to be 1 mm or greater to maintain the mechanical strength of a precursor sheet, and more preferably 20 mm or less considering dispersibility. Also, the average fiber stem diameter of fibers (b2-2) is preferred to be 1 μm or greater to enhance dispersibility, more preferably 50 μm or less to suppress breakage caused by contraction during heat treatment. Moreover, the average fiber diameter of fibrillated portions of fibers (b2-2) is preferred to be 0.01 μm or greater to ensure dewatering when forming a precursor sheet or to maintain gas permeability of a porous electrode substrate. It is also preferred to be 30 μm or less to enhance dispersibility.
<Phenolic Resin (c)>

As described above, a water-soluble phenolic resin and/or a water-dispersible phenolic resin are used as phenolic resin (c) in the embodiments.
(Water-Dispersible Phenolic Resin)

Water-dispersible phenolic resins used in the embodiments are, for example, an emulsion of resol-type phenolic resins shown in Japanese laid-open publication 2004-307815, Japanese laid-open publication 2006-56960 and the like, or water-dispersible phenolic resins well known as water dispersion; more specifically, brand names Phenolite TD-4304 and PE-602, made by DIC Corporation, brand names Sumilite Resin PR-14170, PR-55464 and PR-50607B, made by Sumitomo Bakelite Co., Ltd., brand name Shonole BRE-174, made by Showa Denko K.K., or the like. Water-dispersible phenolic resin tends to bind short carbon fibers (A) and remain as a conductive substance when it is carbonized, the same as regular phenolic resins that use methanol, methyl ethyl ketone or the like as a solvent.

In obtaining water-dispersible phenolic resins, it is preferred to use commercially available water-dispersion types or granular types considering handling and production costs. Using commercially available water-dispersible phenolic resins, residues of organic solvents or unreacted monomers that remain during the production process are less than those of regular phenolic resins. Namely, since amounts of organic solvents and unreacted monomers that volatilize during drying or hot pressing treatment are small, exhaust equipment or the like is simplified and production costs are reduced.
(Water-Soluble Phenolic Resin)

Water-soluble phenolic resins used in the embodiments are, for example, well-known water-soluble phenolic resins such as resol-type phenolic resins with excellent solubility shown in Japanese laid-open patent publication 2009-84382, for example; more specifically, brand name Resitop PL-5634, made by Gun Ei Chemical Industry, brand names Sumilite Resin PR-50781, PR-9800D and PR-55386, made by Sumitomo Bakelite Co., Ltd., brand name Shonole BRL-1583 and BRL-120Z, made by Showa Denko K.K., or the like. Water-soluble phenolic resin tends to bind short carbon fibers (A) and remain as a conductive substance when it is carbonized, the same as regular phenolic resins that use methanol or methyl ethyl ketone as a solvent.

To obtain water-soluble phenolic resins, it is preferred to use commercially available solution types considering handling and production costs. Using commercially available water-soluble phenolic resins, residues of organic solvents or unreacted monomers that remain during the production process are less than those of regular phenolic resins. Namely, since amounts of organic solvents and unreacted monomers that volatilize during drying or hot-pressing treatment are small, exhaust equipment or the like is simplified and production costs are reduced.

Phenolic resin (c) used in the above-described step [2] for adding resin is preferred to be a dispersion or solution type so that it infiltrates well into a sheet. The solid concentration of phenolic resin (c) in a dispersion or solution is preferred to be 1% by mass or greater to enhance the strength and conductivity of a porous electrode substrate, and 30% by mass or less to make a low-viscosity dispersion with a high infiltration rate; 5~20% by mass is more preferred.

As a medium to dilute or disperse the obtained phenolic resin (c), water, alcohol or a combination thereof is preferred considering handling and production costs. In addition, it is more preferred to consist primarily of water considering production costs, atmospheric environmental protection and human environmental protection.

<<Porous Electrode Substrate>>

Using the above-described manufacturing methods, porous electrode substrates listed (i)~(x) below are produced. Those porous electrode substrates have greater sheet strength, excellent gas permeability and conductivity, and lower production costs.

(i) a porous electrode substrate with a structure where short carbon fibers (A) are bound by resin carbide (C) derived from phenolic resin (c).

(ii) a porous electrode substrate with a structure where short carbon fibers (A) are bound by resin carbide (C) derived from phenolic resin (c): short carbon fibers (A) are three-dimensionally entangled in the porous electrode substrate.

(iii) a porous electrode substrate with a structure where short carbon fibers (A) are bound by carbon fibers (B) derived from fiber precursor (b) and by resin carbide (C) derived from phenolic resin (c): short carbon fibers (A) are three-dimensionally entangled in the porous electrode substrate.

(iv) a porous electrode substrate with a structure where short carbon fibers (A) are bound by a carbide: the bulk density is 0.20 g/cm$^3$ or greater but 0.45 g/cm$^3$ or less; and the thickness at 3 MPa pressure is 30% or greater but 70% or less of the thickness at 0.05 MPa pressure.

(v) a porous electrode substrate with a structure where short carbon fibers (A) are bound by a carbide: the bulk density is 0.20 g/cm$^3$ or greater but 0.45 g/cm$^3$ or less; the thickness at 3 MPa pressure is 30% or greater but 70% or less of the initial thickness at 0.05 MPa pressure; and the thickness when decompressed to 0.05 MPa after being pressed at 3 MPa is 60% or greater but 98% or less of the initial thickness.

(vi) a porous electrode substrate with a structure where short carbon fibers (A) are bound by resin carbide (C) derived from phenolic resin (c): short carbon fibers (A) are three-dimensionally entangled in the porous electrode substrate; the bulk density is 0.20 g/cm$^3$ or greater but 0.45 g/cm$^3$ or less; and the thickness at 3 MPa pressure is 30% or greater but 70% or less of the thickness at 0.05 MPa pressure.

(vii) a porous electrode substrate with a structure where short carbon fibers (A) are bound by resin carbide (C) derived from phenolic resin (c): short carbon fibers (A) are three-dimensionally entangled in the porous electrode substrate; the bulk density is 0.20 g/cm$^3$ or greater but 0.45 g/cm$^3$ or less; the thickness at 3 MPa pressure is 30% or greater but 70% or less of the initial thickness at 0.05 MPa pressure; and the thickness when decompressed to 0.05 MPa after being pressed at 3 MPa is 60% or greater but 98% or less of the initial thickness.

(viii) a porous electrode substrate with a structure where short carbon fibers (A) are bound by carbon fibers (B) derived from fiber precursor (b) and by resin carbide (C) derived from phenolic resin (c): short carbon fibers (A) are three-dimensionally entangled in the porous electrode substrate; the bulk density is 0.20 g/cm$^3$ or greater but 0.45 g/cm$^3$ or less; and the thickness at 3 MPa pressure is 30% or greater but 70% or less of the thickness at 0.05 MPa pressure.

(ix) a porous electrode substrate with a structure where short carbon fibers (A) are bound by carbon fibers (B) derived from fiber precursor (b) and by resin carbide (C) derived from phenolic resin (c): the bulk density is 0.20 g/cm$^3$ or greater but 0.45 g/cm$^3$ or less; and the thickness at 3 MPa pressure is 30% or greater but 70% or less of the initial thickness at 0.05 MPa pressure; and the thickness when decompressed to 0.05 MPa after being pressed at 3 MPa is 60% or greater but 98% or less of the initial thickness.

(x) a porous electrode substrate with a structure where short carbon fibers (A) are bound by carbon fibers (B) derived from fiber precursor (b) and by resin carbide (C) derived from phenolic resin (c): short carbon fibers (A) are three-dimensionally entangled in the porous electrode substrate; the bulk density is 0.20 g/cm$^3$ or greater but 0.45 g/cm$^3$ or less; the thickness at 3 MPa pressure is 30% or greater but 70% or less of the initial thickness at 0.05 MPa pressure; and the thickness when decompressed to 0.05 MPa after being pressed at 3 MPa is 60% or greater but 98% or less of the initial thickness.

Carbon fibers (B) are obtained by carbonizing fiber precursor (b), and resin carbide (C) is obtained by carbonizing phenolic resin (c). In addition, any carbide that can bind short carbon fibers (A) may be used for carbides in (iv) and (v) above; for example, carbon fibers (B), resin carbide (C), and those derived from pitch-based or tar-based carbon fibers.

Porous electrode substrates are shaped in a flat sheet, a scroll or the like. The basis weight of a sheet-type porous electrode substrate is preferred to be 15 g/m$^2$ or more but 100 g/m$^2$ or less considering handling. The porosity of a sheet-type porous electrode substrate is preferred to be 50% or greater considering gas permeability, but 90% or less considering its mechanical strength. The thickness of a sheet-type porous electrode substrate is preferred to be 50 μm or greater but 300 μm or less considering handling. In addition, the undulation of a sheet-type porous electrode substrate is preferred to be 5 mm or less so that subsequent treatments such as water-repellent treatment are performed uniformly.

The gas permeability of a porous electrode substrate is 10 mL/hr/cm$^2$/Pa or greater to ensure gas diffusion, and 3000 mL/hr/cm$^2$/Pa or less to prevent drying of the electrolyte membrane. In addition, electrical resistance in a thickness direction (through-plane resistance) of a porous electrode substrate is preferred to be 50 mΩ·cm$^2$ or less to collect efficiently electrons generated at electrode catalysts. Methods for measuring gas permeability and through-plane resistance of a porous electrode substance are described later in examples.

Manufactured by the methods described above, porous electrode substrates according to the embodiments of the present invention are characterized as follows.

<Bulk Density>

In the embodiments of the present invention, the bulk density of a porous electrode substrate is calculated as follows from the basis weight of the porous electrode substrate and the initial thickness of the porous electrode substrate described later in detail.

$$\text{bulk density (g/cm}^3\text{)} = \text{basis weight (g/m}^2\text{)/initial thickness (μm)}$$

If the bulk density is 0.20 g/cm³ or greater, a porous electrode substrate is formed, which is low in through-plane resistance and easy to handle. If the bulk density is 0.45 g/cm³ or less, a porous electrode substrate with excellent gas permeability is obtained. Also, considering mechanical strength and cushion characteristics, the bulk density is preferred to be 0.25 g/cm³ or greater but 0.45 g/cm³ or less.

<Thickness at 3 MPa Pressure>

In a manufacturing method related to the present invention, phenolic resin (c) is added to a sheet material by conducting step [4] for entanglement treatment and step [2] for adding resin to produce a porous electrode substrate in which the thickness at 3 MPa pressure is 30%~70%, preferably 45%~70%, of the initial thickness. If the thickness at 3 MPa pressure is set at 30%~70% of the initial thickness, the porous electrode substrate absorbs the thickness accuracy of other members when integrated into a fuel cell, and exhibits excellent contact with a membrane electrode assembly (MEA).

In the embodiments of the present invention, the initial thickness of a porous electrode substrate is measured as follows using a micro sample pressure testing instrument (brand name: Micro Autograph MST-I, made by Shimadzu Corporation).

First, a 50 mm-diameter upper platen (fixed type) and a 50 mm-diameter lower platen (ball-bearing type) are set parallel in advance, and without sandwiching anything, a load rod is lowered at a stroke speed of 0.4 mm/min. When a pressure has reached 3 MPa, the stroke of the load rod is immediately stopped, and the values at three displacement gauges between the platens are each set at zero. Then, a 25 mm-diameter test piece (porous electrode substrate) is placed between the upper and lower platens and the load rod is lowered at a stroke speed of 0.4 mm/min. When a pressure of 0.05 MPa is exerted on the test piece, the stroke of the load rod is immediately stopped, and 30 seconds later, the values at three displacement gauges between the platens are read, and their average value is set as the initial thickness (thickness at 0.05 MPa pressure).

The thickness at 3 MPa pressure is measured the same as the initial thickness except that the pressure exerted on the test piece is changed from 0.05 MPa to 3 MPa.

<Thickness after being Pressed at 3 MPa and Decompressed to 0.05 MPa>

In a manufacturing method related to the present invention, a porous electrode substrate, in which the thickness after being pressed at 3 MPa and decompressed to 0.05 MPa (thickness after pressure testing) is 60%~98%, preferably 70%~95%, of the initial thickness, is produced by adding phenolic resin (c) at step [2] for adding resin after step [4] for entanglement treatment. If the thickness at 3 MPa pressure is 30%~70% of the initial thickness, and the thickness after pressure testing is 60%~98% of the initial thickness, excellent cushion characteristics in a thickness direction are obtained in a porous electrode substrate. Thus, it is easier to absorb the thickness inaccuracy of other members when a fuel cell is assembled, while absorbing swelling and contraction of the electrolyte membrane caused by fluctuations in electricity generation. Accordingly, unbalanced contact with the MEA is avoided when such a porous electrode substrate is installed in a cell, and its cushion characteristics will surely prevent repeated swelling and contraction of the electrolyte membrane from causing lowered contact with the MEA and decreased performance in generating power.

The thickness after pressure testing is measured as follows. After the thickness at 3 MPa pressure is measured as above, the load rod is raised at a stroke speed of 0.4 mm/min. When the pressure exerted on the test piece is decompressed to 0.05 MPa, the stroke of the load rod is immediately stopped. Then, 30 seconds later, the values of three displacement gauges between platens are read, and their average is set as the thickness after pressure testing.

<Three-Dimensional Entangled Structure>

In the embodiments of the present invention, whether or not short carbon fibers (A) form a three-dimensional entangled structure is determined by observing a cross section of a sheet material (porous electrode substrate) and by measuring the angles between short carbon fibers (A) and a sheet surface at the cross section. The cross section to be observed is positioned perpendicular to a sheet surface of the sheet material.

Figure 3:
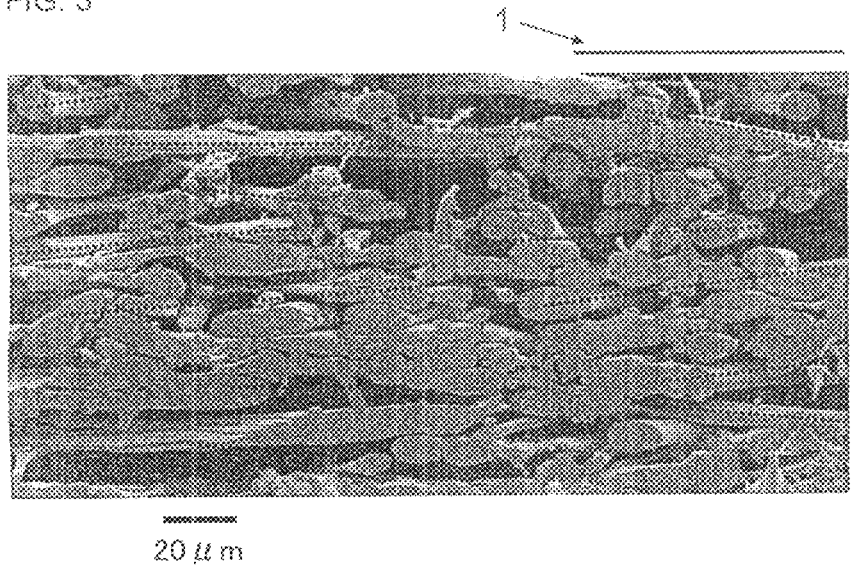
FIG. 3 a view to illustrate a method for measuring the angle of a short carbon fiber to the horizontal surface.

When the average of measured angles between short carbon fibers (A) and a horizontal surface is 3 degrees or greater, or when the maximum value of measured angles between short carbon fibers (A) and a horizontal surface is 10 degrees or greater, it is determined that a three-dimensional entangled structure is formed (has a three-dimensional entangled structure). When the average of measured angles between short carbon fibers (A) and a horizontal surface is smaller than 3 degrees, or when the maximum value of measured angles between short carbon fibers (A) and a horizontal surface is smaller than 10 degrees, it is determined that a three-dimensional entangled structure is not formed (does not have a three-dimensional entangled structure). In particular, as shown in FIG. 3, a SEM (scanning electron microscope) photograph is taken at a cross section in a direction perpendicular to the sheet surface, and short carbon fibers (A) are connected with a line (dotted line shown in FIG. 3) so that the angle between the line and the sheet surface is measured. The number of spots to measure for calculating the average angle may be 50, for example. Line 1 in FIG. 3 is parallel to a horizontal surface.

<<Precursor Sheet>>

Using the above-described manufacturing methods, a precursor sheet is produced prior to sintering (carbonizing) to obtain a porous electrode substrate. The precursor sheet becomes the precursor of a porous electrode substrate. In the embodiments of the present invention, binders such as polyvinyl alcohol (PVA) are not used, or the amount of a binder is small compared with a conventional substrate, the amount of sodium derived from a binder is reduced in a precursor sheet. Specifically, the amount of sodium is preferred to be 150 mg/m² or less, more preferably 100 mg/m² or less, even more preferably 50 mg/m² or less in a precursor sheet. As described above, since sodium in a precursor sheet is discharged from the sheet when heated in carbonization step [3] and may cause damage to the furnace, a lower amount of sodium is preferred for a precursor sheet. More specifically, it is preferred that the precursor sheet of a porous electrode substrate include short carbon fibers (A) and phenolic resin and that the amount of sodium be 150 mg/m² or less. In a precursor sheet, sodium is contained as a sodium compound (for example, sodium sulfate, sodium sulfite, sodium bisulfite, sodium thiosulfate, sodium oxide, sodium peroxide, sodium carbonate, sodium hydrogen carbonate, sodium sulfide, sodium silicate, sodium phosphate, sodium cyanide, sodium cyanate, halide sodium, or the like). As for the above phenolic resin, for example, the above-described water-soluble phenolic resin and water-dispersible phenolic resin, namely, phenolic resin (c) are used. Also, the precursor sheet may contain fiber precursor (b), a binder and the like, the same as in the above-described sheet material.

<<Membrane Electrode Assembly (MEA), Polymer Electrolyte Fuel Cell>>

Porous electrode substrates according to the embodiments of the present invention are suitable for forming membrane electrode assemblies of solid electrolyte fuel cells. Also, membrane electrode assemblies containing porous electrode substrates according to the embodiments of the present invention are suitable for solid electrolyte fuel cells.

EXAMPLES

Detailed specific descriptions of examples of the present invention are provided below. Each physical property in the examples was measured as follows.

(1) Gas Permeability

Gas permeability is measured according to a method based on JIS P-8117. Using a Gurley Densometer, a test piece (porous electrode substrate) was sandwiched in a cell with a 3 mm-diameter hole. Then, 200 mL of air was flowed through the hole under 1.29-kPa pressure, and the time for the air to pass through the hole was measured, and the gas permeability was calculated as follows.

Gas permeability (mL/hr/cm$^2$/Pa)=Amount of permeated gas (mL)/Permeation time (hr)/Area of permeation hole (cm$^2$)/Permeation pressure (Pa)

(2) Through-Plane Resistance

The electric resistance of a porous electrode substrate in a thickness direction (through-plane resistance) was measured by sandwiching a porous electrode substrate between gold-plated copper plates under 0.6 MPa pressure exerted vertically of the copper plates, and electric current was flowed at a density of 10 mA/cm$^2$. Calculation was as follows.

Through-plane resistance (mΩ·cm$^2$)=Measured resistance value (mΩ)×Area of test piece (cm$^2$)

(3) Bending Stiffness (Bending Moment)

The bending stiffness of a porous electrode substrate is measured by a method based on JIS P-8125. Using a Taber-type stiffness tester, one end of a 38 mm-wide×70 mm-long test piece (porous electrode substrate) was clamped to form an open-sided beam, which was then bent 7.5 degrees at a constant speed. Then, the bending moment required for the load length to reach 50 mm was measured. When the direction of the test piece was positioned parallel to a lengthwise direction of an entangled-structure sheet (a porous electrode substrate obtained in step [3]), it was set as MD, and when the test piece was positioned parallel to a crosswise direction (the latitude direction) of the sheet, it was set as TD. The bending stiffness of both MD and TD were evaluated.

(4) Undulation of a Porous Electrode Substrate

A 250 mm-long×250-mm wide porous electrode substrate was set on a flat board, and the difference between the maximum value and the minimum value of the height was measured to calculate the undulation of the porous electrode substrate.

(5) Bulk Density

From the basis weight of a porous electrode substrate and later-described initial thickness of the porous electrode substrate, the bulk density of a porous electrode substrate was calculated as follows.

Bulk density (g/cm$^3$)=Basis weight (g/cm$^2$)/Initial thickness (μm)

(6) Initial Thickness, Thickness at 3 MPa Pressure, Thickness after Pressure Test The initial thickness of a porous electrode substrate is measured as follows using a micro sample pressure testing instrument (brand name: Micro Autograph MST-I, made by Shimadzu Corporation).

First, the parallel degree between a 50 mm-diameter upper platen (fixed) and a 50 mm-diameter lower platen (ball-bearing type) was adjusted, nothing was sandwiched in between, and then a load rod was lowered at a stroke speed of 0.4 mm/min. When the pressure reached 3 MPa, the stroke of the load rod was immediately stopped, and the values at three displacement gauges between platens were each set at zero. Next, a 25 mm-diameter test piece (porous electrode substrate) was placed between the upper and lower platens and the load rod was lowered at a stroke speed of 0.4 mm/min. When a pressure of 0.05 MPa was exerted on the test piece, the stroke of the load rod was immediately stopped, and 30 seconds later, the values at three displacement gauges between the platens were read, and their average value was set as the initial thickness.

Next, the load rod was lowered at a stroke speed of 0.4 mm/min. When a pressure of 3 MPa was exerted, the stroke of the load road was immediately stopped. Then, 30 seconds later, the values of three displacement gauges were read, and their average value was set as the thickness at 3 MPa pressure.

Next, the load rod was raised at a stroke speed of 0.4 mm/min. When the pressure on the test piece was decompressed to 0.05 MPa, the stroke of the load rod was immediately stopped. Then, 30 seconds later, the values of three displacement gauges were read, and their average value was set as the thickness after pressure testing.

When the sheet maintained its shape after being under 3 MPa pressure (after pressure testing), it was evaluated as ○, and when the shape was not maintained, it was evaluated as x.

(7) Amount of Sodium in Precursor Sheet

From the sodium concentration measured by inductively coupled high-frequency plasma emission spectrometry and the basis weight of a precursor sheet, the amount of sodium in a precursor sheet was calculated as follows.

Amount of sodium in precursor sheet (mg/m$^2$)=Basis weight of precursor sheet (mg/m$^2$)×sodium concentration (ppm)

Inductively coupled plasma (ICP) spectrometry is as follows: a test solution is introduced into a high-temperature plasma flame of argon gas induced at a high frequency; after evaporation, atomization and excitation, elements are identified from the emission spectrum wavelength, and the concentration is measured from the spectrum strength. The excitation temperature of argon ICP is as high as 6000~8000 K, and many elements are efficiently excited under the same conditions. Thus, simultaneous multielement analysis can be conducted for main component elements, sub-component elements and micro-component elements. Moreover, since inactive gas (argon) is used, oxides and nitrides are seldom produced, allowing analyses to be conducted without being much affected by chemical interference or ionization interference. Also, since the technique has excellent stability and accuracy in analytical results, it is preferable to other techniques such as X-ray fluorescence analysis and atomic absorption spectrometry.

Example 1

As for short carbon fibers (A), PAN-based carbon fibers with an average fiber diameter of 7 μm and average fiber length of 3 mm were prepared. Also, as for carbon fiber precursor short fibers (b1), short acrylic fibers with an average fiber diameter of 4 μm and average fiber length of 3 mm were prepared (brand name D122, made by Mitsubishi Rayon Co., Ltd.) In addition, as for fibrillar fibers (b2), prepared was polyacrylonitrile-based pulp (b2-1) having numerous fibrils with a diameter of 3 μm or less branched out from fibrous stems formed by an injection-coagulation method. A sheet material and a three-dimensionally entangled-structure sheet formed by entanglement treatment were produced by the following wet continuous sheet-forming method and by continuous jetting of pressurized water.

Wet Continuous Sheet-Forming
(1) Disaggregation of Short Carbon Fibers (A)

PAN-based carbon fibers with an average fiber diameter of 7 μm and average fiber length of 3 mm were dispersed in water at a fiber concentration of 1% (10 g/L), and put through a disc refiner (made by Kumagai Riki Kogyo) for disaggregation treatment. Accordingly, disaggregated fiber slurry (SA) was obtained.

(2) Disaggregation of Carbon Fiber Precursor Short Fibers (b1)

As for carbon fiber precursor short fibers (b1), short acrylic fibers with an average fiber diameter of 4 μm and average fiber length of 3 mm (brand name D122, made by Mitsubishi Rayon Co., Ltd.) were dispersed in water at a fiber concentration of 1% (10 g/L). Accordingly, disaggregated fiber slurry (Sb1) was obtained.

(3) Disaggregation of Fibrillar Fibers (b2)

As for fibrillar fibers (b2), polyacrylonitrile-based pulp having numerous fibrils with a diameter of 3 μm or less branched out from fibrous stems formed by injection-coagulation were dispersed in water at a fiber concentration of 1% (10 g/L). Accordingly, disaggregated fiber slurry (Sb2) was obtained.

(4) Preparing Sheet-Forming Slurry

Disaggregated fiber slurry (SA), disaggregated fiber slurry (Sb1) and disaggregated fiber slurry (Sb2) and a diluent were measured and put into a slurry supply tank, with a mass ratio of short carbon fibers (A) to carbon fiber precursor short fibers (b1) and to fibrillar fibers (b2) at 40:40:20, and with a fiber concentration in slurry (hereinafter referred to as flock) at 1.7 g/L. Furthermore, polyacrylamide is added to prepare sheet-forming slurry with a viscosity of 22 mPa·s (centipoise).

Treatment Apparatus

The apparatus is structured as follows: a sheet-material conveyor equipped with a belt formed by connecting 60-cm wide×585-cm long plastic nets of plain mesh and a driver to rotate the net continuously; a sheet-forming slurry supply apparatus with a slurry supply width of 48 cm and slurry supply amount of 30 L/min; a reduced-pressure dewatering apparatus positioned under the net; and a high-pressure water-jetting apparatus shown below. Three nozzles of two different types as shown in table 1 were used as water-jet nozzles.

TABLE 1

| nozzle | hole diameter | number of holes | crosswise hole pitch | array | nozzle effective width |
|---|---|---|---|---|---|
| 1 | φ (diameter) 0.15 mm | 501 | 1 mm | single row | 500 mm |
| 2 | φ 0.15 mm | 501 | 1 mm | single row | 500 mm |
| 3 | φ 0.15 mm | 1002 | 1.5 mm | triple rows (row pitch 5 mm) | 500 mm |

(5) Producing Sheet Material and Performing Three-Dimensional Entanglement Treatment through High-Pressure Water Jetting On the net of a test instrument, the above sheet-forming slurry was supplied using a metering pump. The flow of sheet-forming slurry was widened to a predetermined size by going through a flow box for setting a uniform flow. Next, the slurry was put through a section for settling and natural dewatering, and the slurry was completely dewatered using a dewatering apparatus under reduced pressure. Then, wet web with a target basis weight of 40 g/m² was loaded on the net (steps [1] and [7]). When the process was completed, the sheet material was put under water-jet nozzles positioned in the back of the test instrument so that water-jetting pressures at 1 MPa (nozzle 1), 1 MPa (nozzle 2) and 1 MPa (nozzle 3) in that order were exerted for entanglement treatment (step [4]).

Using a heat treatment testing machine, Pin Tenter (model number: PT-2A-400, made by Tsujii Dyeing Machine Manufacturing Co., Ltd.), the sheet material after the entanglement treatment was dried at 150° C. for 3 minutes (step [7]), and a three-dimensionally entangled-structure sheet with a basis weight of 41 g/m² was obtained. In the three-dimensionally entangled-structure sheet, it was observed that carbon fiber precursor short fibers (b1) and fibrillar fibers (b2) were well dispersed.

(6) Steps for Adding Resin and Drying

Next, a resin-containing solution was prepared using a water-soluble resol-type phenolic resin solution (brand name PL-5634, made by Gun Ei Chemical Industry), which was diluted by pure water to set a resin solid content at 5% by mass. The resin-containing solution was impregnated into the three-dimensionally entangled-structure sheet (step [2]), which was left at room temperature overnight so that the sheet was sufficiently dried out (step [6]). Accordingly, a precursor sheet with a nonvolatile component of resin at 52% by mass was obtained.

(7) Hot Pressing

Both surfaces of the precursor sheet were sandwiched by paper coated with a silicone-based release agent, preheated at 180° C. for one minute using a batch-press apparatus, and hot pressed under 6 MPa pressure for 3 minutes (step [5]). Accordingly, an intermediate substrate with flat surfaces was obtained.

(8) Carbonization

The intermediate substrate was carbonized in inert gas (nitrogen) atmosphere at 2000° C. (step [3]), and a porous carbon electrode substrate was obtained where short carbon fibers (A) are bound by fibrous resin carbide (carbon fibers (B)) and resin carbide (C) with irregular shapes. FIG. 1 shows a surface photograph to observe the obtained porous carbon electrode substrate taken by a scanning electron microscope. The porous electrode substrate showed no surface contraction caused by heat treatment, the undulation and warping of the sheet were small at less than 2 mm, and the gas permeability, thickness and through-plane resistance were each excellent. As shown in FIG. 1, it was confirmed that short carbon fibers (A) dispersed in a three-dimensional structure were bound to each other by fibrous resin carbide (carbon fibers (B)) and resin carbide (C) with irregular shapes. When a surface compression load of 3 MPa was exerted on the porous electrode substrate, it maintained its sheet shape. The composition of the porous electrode substrate and the evaluation results are shown in Table 2.

Example 2

A porous electrode substrate was obtained by the same process as in example 1 except for the following:

The combining ratio (mass ratio) of short carbon fibers (A) to carbon fiber precursor short fibers (b1) and to fibrillar fibers (b2) for forming a sheet material was 50:30:20.

The water-jetting pressures in entanglement treatment were set at 1 MPa (nozzle 1), 2 MPa (nozzle 2) and 1 MPa (nozzle 3).

The resin-containing solution was set to have a resin solid content of 15% by mass and was impregnated into a three-dimensionally entangled-structure sheet. Then, The sheet was dried well at 80° C.

Hot pressing was conducted under conditions of preheating for 30 seconds, pressure at 4.5 MPa and time for 30 seconds.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 3

A porous electrode substrate was obtained by the same process as in example 2 except for the following:

As fibrillar fibers (b2) for forming a sheet material, fibers (b2-2) as follows were used: splittable acrylic sea-water composite short fibers consisting of diacetate (cellulose acetate) and an acrylic polymer to be fibrillated by beating (brand name: Vonnel M.V.P.-C651, average fiber length: 3 mm, made by Mitsubishi Rayon Co., Ltd.), on which beating was performed.

As for a water-soluble phenolic resin solution to be used for adding resin, a resol-type phenolic resin solution (brand name: PR-50781, made by Sumitomo Bakelite Co., Ltd.) was used, which was diluted with pure water to set the resin solid content in the resin-containing solution at 10% by mass.

Hot pressing was conducted under conditions of temperature at 150° C., preheating for zero second, pressure at 3 MPa and time for 3 minutes.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 4

A porous electrode substrate was obtained by the same process as in example 2 except for the following:

The mass ratio of short carbon fibers (A) to carbon fiber precursor short fibers (b1) and to fibrillar fibers (b2) was 70:10:20, and the target basis weight was set at 45 g/m$^2$.

The resin solid content in the resin-containing solution was set at 10% by mass.

Hot pressing was conducted under conditions of preheating for zero second, pressure at 6 MPa and time for 1 minute.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 5

A porous electrode substrate was obtained by the same process as in example 4 except for the following:

As for a water-soluble phenolic resin solution to be used for adding resin, a resol-type phenolic resin solution (brand name: PR-50781, made by Sumitomo Bakelite Co., Ltd.) was used, which was diluted with pure water to set the resin solid content in the resin-containing solution at 5% by mass.

Hot pressing was conducted under conditions of temperature at 150° C., preheating for 1 minute, pressure at 4.5 MPa and time for 30 seconds.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 6

A porous electrode substrate was obtained by the same process as in example 2 except for the following:

When forming a sheet material, the mass ratio of short carbon fibers (A) to carbon fiber precursor short fibers (b1) and to fibrillar fibers (b2) was 80:10:10, and the target basis weight was set at 55 g/m$^2$.

Hot pressing was conducted under conditions of temperature at 150° C., preheating for 1 minute, pressure at 3 MPa and time for 1 minute.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 7

A porous electrode substrate was obtained by the same process as in example 6 except for the following:

As for a water-soluble phenolic resin solution to be used for adding resin, a resol-type phenolic resin solution (brand name: PR-50781, made by Sumitomo Bakelite Co., Ltd.)

was used, which was diluted with pure water to set the resin solid content in the resin-containing solution at 10% by mass.

Hot pressing was conducted under conditions of temperature at 120° C., preheating for 30 seconds, pressure at 6 MPa and time for 30 seconds.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Comparative Example 1

Figure 2:
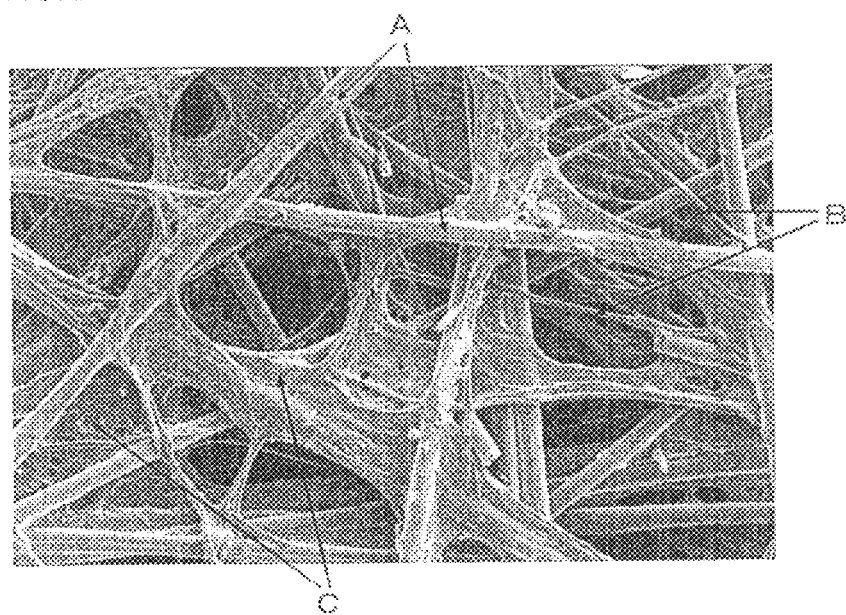
FIG. 2 another photograph taken by a scanning electron microscope showing a surface of a porous electrode substrate according to an embodiment of the present invention.

A porous electrode substrate was obtained by the same process as in example 3 except that a water-soluble phenolic resin was not added to a three-dimensionally entangled-structure sheet (step [2] for adding resin was not performed), hot-pressing step [5] was conducted on the three-dimensionally entangled-structure sheet under conditions of temperature at 180° C. and pressure at 6 MPa. The obtained porous electrode substrate was too fragile to measure its bending stiffness. When a surface compression load of 3 MPa was exerted on the porous electrode substrate, the sheet could not maintain its shape. The composition of the porous electrode substrate and evaluation results are shown in FIG. 2.

Example 8

A porous electrode substrate was produced where short carbon fibers (A) were bound by fibrous resin carbide (carbon fibers (B)) and resin carbide (C) with irregular shapes by the same process as in example 1 except that a water dispersion of water-dispersible resol-type phenolic resin (brand name TD-4304, made by DIC Corporation) was used instead of a resol-type phenolic resin solution (brand name: PL-5634, made by Gun Ei Chemical Industry). FIG. 2 shows a surface photograph to observe the obtained porous electrode substrate taken by a scanning electron microscope.

The obtained porous electrode substrate showed no surface contraction caused by heat treatment, the undulation and warping of the sheet were small at less than 2 mm, and the gas permeability, thickness and through-plane resistance were each excellent. As shown in FIG. 2, it was confirmed that short carbon fibers (A) dispersed in the three-dimensional structure were bound by fibrous resin carbide (carbon fibers (B)) and resin carbide (C) with irregular shapes. When a surface compression load of 3 MPa was exerted on the porous electrode substrate, the sheet maintained its shape. The composition of the porous electrode substrate and evaluation results are shown in FIG. 2.

Example 9

A porous electrode substrate was obtained by the same process as in example 8 except for the following:

The mass ratio of short carbon fibers (A) to carbon fiber precursor short fibers (b1) and to fibrillar fibers (b2) was 50:30:20.

Water-jetting pressures during entanglement treatment were 1 MPa (nozzle 1), 2 MPa (nozzle 2) and 1 MPa (nozzle 3).

A water dispersion of water-dispersible resol-type phenolic resin (brand name; PE-602, made by DIC Corporation) was used for adding resin, and was impregnated into the three-dimensionally entangled-structure sheet. The sheet was dried well at 80° C. using an air-blow dryer.

Hot pressing was conducted under conditions of temperature at 120° C. and time for 1 minute.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 10

A porous electrode substrate was obtained by the same process as in example 9 except for the following:

The mass ratio of short carbon fibers (A) to carbon fiber precursor short fibers (b1) and to fibrillar fibers (b2) was 70:10:20, and the target basis weight was set at 45 g/m$^2$.

The resin solid content in the resin-containing solution was 15% by mass.

Hot pressing was conducted under conditions of preheating for 30 seconds, pressure at 3 MPa and time for 3 minutes.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 11

A porous electrode substrate was obtained by the same process as in example 9 except for the following:

The mass ratio of short carbon fibers (A) to carbon fiber precursor short fibers (b1) and to fibrillar fibers (b2) was 80:10:10, and the target basis weight was set at 55 g/m$^2$.

When hot pressing was conducted, temperature was set at 180° C., preheating for zero second, pressure at 4.5 MPa and time for 3 minutes.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 12

A porous electrode substrate was obtained by the same process as in example 9 except for the following:

As fibrillar fibers (b2) for forming a sheet material, fibers (b2-2) as follows were used: splittable acrylic sea-water composite short fibers consisting of diacetate (cellulose acetate) and an acrylic polymer to be fibrillated by beating (brand name: Vonnel M.V.P.-C651, average fiber length: 3 mm, made by Mitsubishi Rayon Co., Ltd.), on which beating was performed.

As for a resin water dispersion for adding resin, a water dispersion of water-dispersible resol-type phenolic resin (brand name: PR-14170, made by Sumitomo Bakelite Co., Ltd.) was used, and the resin solid content in the resin-containing solution was set at 7.5% by mass.

After resin was impregnated into the three-dimensionally entangled-structure sheet, The sheet was dried well at 90° C.

Hot pressing was conducted under conditions of temperature at 180° C., preheating for zero second, and time for 30 seconds.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 13

A precursor sheet was obtained by the same process as in example 12 except that the mass ratio of short carbon fibers (A) to carbon fiber precursor short fibers (b1) and to fibrillar fibers (b2) was 60:20:20, the target basis weight was set at 65 g/m², and the resin solid content in the resin-containing solution was 5% by mass.

Next, the precursor sheet was hot pressed using a continuous hot-pressing apparatus equipped with a pair of endless belts disclosed in Japanese Patent 3699447, for example, and a hot pressed sheet with flat surfaces (intermediate substrate) was obtained. The preheating temperature in the preheating zone was 200° C. and the preheating time was 5 minutes, and the temperature at the hot-pressing zone was 240° C. under line pressure at $8.0 \times 10^4$ N/m. Here, the hot-pressed sheet was sandwiched between papers coated with a silicone-based release agent so that the sheet would not stick to the belt. Moreover, the hot pressed sheet was carbonized in an inert gas (nitrogen) atmosphere at 2000° C. Accordingly, a porous electrode substrate was obtained where short carbon fibers (A) were bound by fibrous resin carbide (carbon fibers (B)) and resin carbide (C) with irregular shapes.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

Example 14

A porous electrode substrate was obtained by the same process as in example 13 except that the target basis weight of the three-dimensionally entangled-structure sheet was set at 55 g/m², and a water dispersion of resol-type phenolic resin (brand name: PR-55464, made by Sumitomo Bakelite Co., Ltd.) was used for adding resin.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 2.

TABLE 2

| | | | Example | | | | | | | Comp example | Example | | | | | | |
|---|---|---|---|---|---|---|---|---|---|---|---|---|---|---|---|---|---|
| | | | 1 | 2 | 3 | 4 | 5 | 6 | 7 | 1 | 8 | 9 | 10 | 11 | 12 | 13 | 14 |
| Sheet material | Short carbon fiber (A) | part by mass | 40 | 50 | 50 | 70 | 70 | 80 | 80 | 50 | 40 | 50 | 70 | 80 | 50 | 60 | 60 |
| | Short carbon fiber precursor (b1) | part by mass | 40 | 30 | 30 | 10 | 10 | 10 | 10 | 30 | 40 | 30 | 10 | 10 | 30 | 20 | 20 |
| | Fibrillar fiber (b2) (b2-1)*[1] | part by mass | 20 | 20 | — | 20 | 20 | 10 | 10 | — | 20 | 20 | 20 | 10 | 20 | — | — |
| | (b2-2)*[2] | part by mass | — | — | 20 | — | — | — | — | 20 | — | — | — | — | — | 20 | 20 |
| | Basis weight of sheet material | g/m² | 41 | 40 | 40 | 42 | 43 | 52 | 52 | 38 | 39 | 40 | 43 | 52 | 38 | 63 | 54 |
| | Nozzle 1, 2, 3: water-injection pressure | MPa | 1.2.1 | 1.2.1 | 1.2.1 | 1.2.1 | 1.2.1 | 1.2.1 | 1.2.1 | 1.2.1 | 1.1.1 | 1.2.1 | 1.2.1 | 1.2.1 | 1.2.1 | 1.2.1 | 1.2.1 |
| Precursor sheet | Phenolic resin (brand name) | | PL5634 | PL5634 | PR50781 | PL5634 | PR50781 | PL5634 | PR50781 | — | TD4304 | PE602 | PE602 | PE602 | PR14170 | PR14170 | PR55464 |
| | Solid content of phenolic resin | % by mass | 5 | 15 | 10 | 10 | 5 | 15 | 10 | — | 5 | 5 | 15 | 5 | 7.5 | 5 | 5 |
| | Method for applying resin | | impregnated | impregnated | impregnated | impregnated | impregnated | impregnated | impregnated | — | impregnated | impregnated | impregnated | impregnated | impregnated | impregnated | impregnated |
| | Basis weight of precursor sheet | g/m² | 62 | 59 | 50 | 75 | 56 | 96 | 79 | — | 57 | 46 | 87 | 66 | 55 | 95 | 83 |
| | Sodium content | mg/m² | 9 | 7 | 6 | 3 | 3 | 3 | 3 | — | 9 | 7 | 3 | 3 | 6 | 6 | 5 |
| | Hot-pressing method | | batch | batch | batch | batch | batch | batch | batch | batch | batch | batch | batch | batch | batch | continuous | continuous |
| | Hot-pressing temperature | degree C. | 180 | 180 | 150 | 180 | 150 | 150 | 120 | 180 | 180 | 120 | 120 | 180 | 180 | 240 | 240 |
| | Preheat time before hot pressing | | 1 min | 30 sec | none | none | 1 min | 1 min | 30 sec | none | 1 min | 1 min | 30 sec | none | none | 5 min | 5 min |
| | Hot-pressing pressure | MPa | 6 | 4.5 | 3 | 6 | 4.5 | 3 | 6 | 6 | 6 | 6 | 3 | 4.5 | 6 | — | — |
| | Hot-pressing time | | 3 min | 30 sec | 3 min | 1 min | 30 sec | 1 min | 30 sec | 3 min | 3 min | 1 min | 3 min | 3 min | 30 sec | — | — |
| Porous electrode substrate | Basis weight | g/m² | 29 | 29 | 28 | 44 | 40 | 53 | 52 | 32 | 28 | 27 | 55 | 48 | 51 | 61 | 45 |
| | Bulk density | g/cm³ | 0.32 | 0.34 | 0.28 | 0.39 | 0.21 | 0.26 | 0.25 | 0.22 | 0.28 | 0.27 | 0.29 | 0.38 | 0.38 | 0.33 | 0.32 |
| | Gas permeability | mL/hr/cm²/Pa | 1900 | 2100 | 2200 | 2700 | 2700 | 2900 | 2500 | 1800 | 1600 | 2000 | 2500 | 2100 | 1300 | 500 | 1100 |
| | Through-plane resistance | mohm·cm² | 6.0 | 4.3 | 6.1 | 4.0 | 6.9 | 10.4 | 10.1 | 7.0 | 5.7 | 6.1 | 5.9 | 5.0 | 7.0 | 9.4 | 7.0 |
| | Bending stiffness MD | g·cm | 4.5 | 3.6 | 4.9 | 7.9 | 8.0 | 19.8 | 20.2 | unmeasurable | 5.3 | 5.1 | 15.5 | 9.5 | 5.2 | 8.7 | 14.5 |
| | Bending stiffness TD | g·cm | 1.7 | 1.6 | 2.1 | 5.3 | 2.6 | 7.5 | 6.7 | unmeasurable | 2.0 | 3.1 | 4.3 | 2.6 | 2.7 | 3.4 | 8.4 |
| | Sheet condition after being pressed at 3 MPa | | ○ | ○ | ○ | ○ | ○ | ○ | ○ | X | ○ | ○ | ○ | ○ | ○ | ○ | ○ |
| | Initial thickness | micron | 89 | 86 | 100 | 111 | 188 | 207 | 213 | 145 | 100 | 98 | 191 | 127 | 135 | 185 | 139 |
| | Thickness at 3 MPa/Initial thickness × 100 | % | 42 | 63 | 65 | 55 | 50 | 49 | 42 | 31 | 41 | 53 | 52 | 49 | 58 | 45 | 46 |
| | Thickness after pressure test/initial thickness × 100 | % | 70 | 88 | 91 | 84 | 80 | 78 | 76 | 31 | 73 | 81 | 82 | 79 | 85 | 75 | 75 |
| | undulation | mm | <2 | <2 | <2 | <2 | <2 | <2 | <2 | — | <2 | <2 | <2 | <2 | <2 | <2 | <2 |

*[1] (b2-1): polyacrylonitrile-based pulp with numerous branched fibrils.
*[2] (b2-2): fibrils made by beating a splittable acrylic sea-island composite short fiber consisting of cellulose acetate and an acrylic polymer.

Example 15

A porous electrode substrate where short carbon fibers (a) are bound by fibrous resin carbide (carbon fibers (B)) and resin carbide (C) with irregular shapes was obtained by the same process as in example 1 except that (4) preparing sheet-forming slurry, (5) producing a sheet material and performing three-dimensional entanglement by high-pressure water jetting, (6) adding resin and drying, and (7) hot pressing were conducted as described below.

(4) Preparing Sheet-Forming Slurry

Disaggregated fiber slurry (SA), disaggregated fiber slurry (Sb1) and disaggregated fiber slurry (Sb2) and a diluent were measured and put into a slurry supply tank, with a mass ratio of short carbon fibers (A) to carbon fiber precursor short fibers (b1) and to fibrillar fibers (b2) of 50:30:20, and with a fiber concentration in slurry (flock) at 1.4 g/L. Furthermore, polyacrylamide was added to prepare sheet-forming slurry with a viscosity of 22 mPa~s (centipoise).

(5) Producing Sheet Material and Performing Three-Dimensional Entanglement Treatment by High-pressure Water Jetting On the net of a test instrument, the above sheet-forming slurry was supplied using a metering pump. The flow of sheet-forming slurry was adjusted to a predetermined width by passing through a flow box for setting a uniform flow. Next, the slurry was put through a section for settling and natural dewatering, and the slurry was completely dewatered using a dewatering apparatus under reduced pressure. Then, wet web with a target basis weight of 40 g/m$^2$ was loaded on the net (steps [1] and [7]). When the process was completed, the slurry was put under water-jet nozzles positioned in the back of the test instrument so that water-jetting pressures at 1 MPa (nozzle 1), 2 MPa (nozzle 2) and 1 MPa (nozzle 3) in that order were exerted on the precursor for entanglement treatment (step [4]). Accordingly, an entangled-structure wet sheet was obtained. When the entangled-structure wet sheet was dried, the basis weight was 42 g/m$^2$ and contained 494 parts by mass of water based on 100 parts by mass of the dried sheet. Carbon fiber precursor short fibers (b1) and fibrillar fibers (b2) were well dispersed in the sheet.

(6) Adding Resin and Drying

A resin-containing solution was prepared using a water dispersion of water-dispersible resol-type phenolic resin (brand name PR-55464, made by Sumitomo Bakelite Co., Ltd.), which was then diluted by pure water to set a resin solid content at 10% by mass. The resin-containing solution was sprayed onto the entangled-structure wet sheet (step [2]) using a double-tube spray valve (brand name: BP-107DN-SP, made by Ace-Giken Co., Ltd.) at liquid pressure of 0.2 MPa and air pressure of 0.2 MPa. Then, the sheet was put through a squeeze roll, and dried out well in a hot-air furnace at 100° C. (step [6]). Accordingly, a precursor sheet having 36 g/m$^2$ of nonvolatile components of resin was obtained.

(7) Hot Pressing

Both surfaces of the precursor sheet were sandwiched by paper coated with a silicone-based release agent, and hot pressed in a batch-press apparatus under conditions of no preheating, temperature of 150° C., pressure of 3 MPa for 1 minute (step [5]). Accordingly, a hot-pressed sheet with a smooth surface was obtained.

The obtained porous electrode substrate showed no surface contraction caused by heat treatment, the undulation and warping of the sheet were small at less than 2 mm, and the gas permeability, thickness and through-plane resistance were each excellent. When a surface compression load of 3 MPa was exerted on the porous electrode substrate, it maintained its sheet shape. The composition of the porous electrode substrate and the evaluation results are shown in Table 3.

Example 16

A wet sheet with a three-dimensionally entangled structure was produced by the same process as in example 15 except for the following:

As fibrillar fibers (b2), fibers (b2-2) as follows were used: refined splittable acrylic sea-water composite short fibers consisting of diacetate (cellulose acetate) and an acrylic polymer to be fibrillated by beating (brand name: Vonnel M.V.P.-C651, average fiber length: 3 mm, made by Mitsubishi Rayon Co., Ltd.), on which beating was performed. For refining, the splittable acrylic sea-water composite short fibers were dispersed in water at a fiber concentration of 0.2% (2 g/L), and were put through a disc refiner (made by Kumagai Riki Kogyo). Accordingly, fibers (b2-2) with an approximate freeness of 350~400 mL were obtained.

When preparing sheet-forming slurry, the mass ratio of short carbon fibers (A) to carbon fiber precursor short fibers (b1) and to fibrillar fibers (b2) was 60:20:20

Then, a porous electrode substrate was produced from the obtained entangled-structure sheet by the same process as in example 15 except for the following:

A water dispersion of resol-type phenolic resin (brand name: PR-14170, made by Sumitomo Bakelite Co., Ltd.) was used for adding resin.

As a method for adding resin, a vortex-flow atomization nozzle (brand name: AM45, made by Atomax) was used to spray resin onto the entangled-structure wet sheet using a liquid suction method at air pressure of 0.2 MPa.

Hot pressing was conducted under conditions of temperature at 180° C. and pressure at 4.5 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 17

A wet sheet with a three-dimensionally entangled structure was produced by the same process as in example 15 except that the mass ratio of short carbon fibers (A) to carbon fiber precursor short fibers (b1) and to fibrillar fibers (b2) was 80:10:10 when preparing sheet-forming slurry.

Then, a porous electrode substrate was produced from the obtained entangled-structure sheet by the same process as in example 15 except for the following:

Instead of using a resin water dispersion for adding resin, a solution of water-soluble resol-type phenolic resin (brand name: PR-50781, made by Sumitomo Bakelite Co., Ltd.) was used.

The resin-containing solution was dripped onto the three-dimensionally entangled-structure wet sheet using a double-tube spray valve (brand name: BP-107DN-SP, made by Ace-Giken Co., Ltd.) at liquid pressure of 0.2 MPa and air pressure of 0 MPa.

After resin was added to the entangled-structure wet sheet, the sheet was put through a squeeze roll, but was not dried (step [6] was not conducted).

Hot pressing was conducted under conditions of temperature at 200° C. and pressure at 6 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 18

A wet sheet with a three-dimensionally entangled structure was obtained by the same process as in example 15. Then, a porous electrode substrate was produced from the obtained entangled-structure sheet by the same process as in example 15 except for the following:

A water dispersion of resol-type phenolic resin (brand name: PR-14170, made by Sumitomo Bakelite Co., Ltd.) was used for adding resin, and the resin solid content in the resin-containing solution was set at 15% by mass.

The resin-containing solution was dripped onto the three-dimensionally entangled-structure wet sheet using a double-tube spray valve (brand name: BP-107DN-SP, made by Ace-Giken Co., Ltd.) at liquid pressure of 0.2 MPa and air pressure of 0 MPa.

After resin was added to the entangled-structure wet sheet, the sheet was put through a squeeze roll, but was not dried.

Hot pressing was conducted under conditions of temperature at 180° C. and pressure at 6 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 19

A wet sheet with a three-dimensionally entangled-structure was obtained by the same process as in example 16, and then a porous electrode substrate was produced from the obtained entangled-structure sheet by the same process as in example 15 except for the following:

Instead of a resin water dispersion, a resol-type phenolic resin solution (brand name: PR-50781, made by Sumitomo Bakelite Co., Ltd.) was used for adding resin, and the resin solid content in the resin-containing solution was 15% by mass.

The temperature for hot pressing the precursor sheet was 200° C.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 20

A wet sheet with a three-dimensionally entangled structure was obtained by the same process as in example 17, and then a porous electrode substrate was produced from the obtained entangled-structure sheet by the same process as in example 15 except for the following:

The resin solid content in the resin-containing solution was 15% by mass.

As a method for adding resin, a vortex-flow atomization nozzle (brand name: AM45, made by Atomax) was used to spray resin onto the three-dimensionally entangled-structure wet sheet using a liquid suction method at air pressure of 0.2 MPa.

After resin was added to the entangled-structure wet sheet, the sheet was put through a squeeze roll, but was not dried.

The pressure for hot pressing was 4.5 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 21

A wet sheet with a three-dimensionally entangled structure was produced by the same process as in example 15, and then a porous electrode substrate was obtained by the same process as in example 15 except for the following:

Using a heat treatment testing machine, Pin Tenter (model number: PT-2A-400, made by Tsujii Dyeing Machine Manufacturing Co., Ltd.), the three-dimensionally entangled-structure wet sheet was dried at 150° C. for 3 minutes to obtain a dry entangled-structure sheet (including drying step [7] between step [4] for entanglement and step [2] for adding resin).

Instead of a resin water dispersion, a resol-type phenolic resin solution (brand name: PR-50781, made by Sumitomo Bakelite Co., Ltd.) was used for adding resin.

The resin-containing solution was dripped onto the three-dimensionally entangled-structure dried sheet using a double-tube spray valve (brand name: BP-107DN-SP, made by Ace-Giken Co., Ltd.) at liquid pressure of 0.2 MPa and air pressure of 0 MPa.

The pressure for hot pressing the precursor sheet was 4.5 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 22

A wet sheet with a three-dimensionally entangled structure was obtained by the same process as in example 16. Then, a porous electrode substrate was produced from the obtained entangled-structure sheet by the same process as in example 15 except for the following:

Using a heat treatment testing machine, Pin Tenter (model number: PT-2A-400, made by Tsujii Dyeing Machine Manufacturing Co., Ltd.), the three-dimensionally entangled-structure wet sheet was dried at 150° C. for 3 minutes to obtain a dried sheet with a three-dimensionally entangled structure.

Hot pressing was conducted under conditions of temperature at 180° C. and pressure at 6 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 23

A wet sheet with a three-dimensionally entangled structure was obtained by the same process as in example 17, and then a porous electrode substrate was produced from the obtained entangled-structure sheet by the same process as in example 15 except for the following:

Using a heat treatment testing machine, Pin Tenter (model number: PT-2A-400, made by Tsujii Dyeing Machine Manufacturing Co., Ltd.), the three-dimensionally entangled-structure wet sheet was dried at 150° C. for 3 minutes to obtain a dried sheet with a three-dimensionally entangled structure.

A water dispersion of resol-type phenolic resin (brand name: PR-14170, made by Sumitomo Bakelite Co., Ltd.) was used for adding resin.

As a method for adding resin, a vortex-flow atomization nozzle (brand name: AM45, made by Atomax) was used to spray resin onto the three-dimensionally entangled-structure dried sheet by a liquid suction method at air pressure of 0.2 MPa.

After resin was added to the three-dimensionally entangled-structure sheet, the sheet was put through a squeeze roll, but was not dried.

The temperature for hot pressing was 200° C.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 24

(1) Producing Membrane Electrode Assembly (MEA)

Two pairs of porous electrode substrates obtained in example 6 were prepared for cathode and anode porous electrode substrates. A laminate was prepared where a catalyst layer (catalyst area: 25 cm$^2$, amount of attached platinum: 0.3 mg/cm$^2$) made of catalyst-carrying carbon (catalyst: platinum, amount of catalyst: 50% by mass) was formed on both surfaces of perfluorosulfonate-based polymer electrolyte membrane (thickness: 30 μm). The laminate was sandwiched by cathode and anode porous electrode substrates, which were then bonded to each other. Accordingly, an MEA was obtained.

(2) Evaluation of Fuel-Cell Properties of MEA

The obtained MEA was sandwiched by two carbon separators with a serpentine channel to form a polymer electrolyte fuel cell (single cell). The fuel cell properties were evaluated by measuring the current density-voltage characteristics of the single cell. Hydrogen gas was used as a fuel gas, and air was used as an oxidation gas. The single cell was set at temperature of 80° C., fuel gas utilization rate was 60% and oxidation gas utilization rate was 40%. The fuel gas and oxidation gas were each humidified by passing through bubblers each set at 80° C. As a result, it was found that the properties were excellent, showing a cell voltage of the fuel cell at 0.600 V and the internal resistance of the cell at 4.8 mΩ when current density was 0.8 A/cm$^2$.

Example 25

A membrane electrode assembly (MEA) was produced the same as in example 24 except that porous electrode substrates obtained in example 14 were used, and the fuel cell properties of the MEA were evaluated. As a result, it was found that the properties were excellent, showing a cell voltage of the fuel cell at 0.612 V and the internal resistance of the cell at 4.5 mΩ when current density was 0.8 A/cm$^2$.

Example 26

A membrane electrode assembly (MEA) was produced the same as in example 24 except that porous electrode substrates obtained in example 18 were used, and the fuel cell properties of the MEA were evaluated. As a result, it was found that the properties were excellent, showing a cell voltage of the fuel cell at 0.627 V and the internal resistance of the cell at 3.3 mΩ when current density was 0.8 A/cm$^2$.

Example 27

A porous electrode substrate was obtained by the same process as in example 23 except for the following:

Carbon fiber precursor short fibers (b1) was not used, and polyacrylonitrile-based pulp (b2-1) formed by injection-coagulation where numerous fibrils with a diameter of 3 μm or less branched out from fibrous stems was used for fibrillar fibers (b2), and the mass ratio of short carbon fibers (A) to fibrillar fibers (b2-1) was set at 80:20.

A sheet material was formed from sheet-forming slurry which was completely dewatered using a dewatering apparatus under reduced pressure (steps [1] and [7]), and then step [2] for adding resin was conducted without performing entanglement treatment on the sheet material.

A resol-type phenolic resin water dispersion (brand name: PR-55464, made by Sumitomo Bakelite Co., Ltd.) was used for adding resin, and the resin solid content in the resin-containing solution was 15% by mass.

The resin-containing solution was dripped onto the completely dewatered sheet material using a double-tube spray valve (brand name: BP-107DN-SP, made by Ace-Giken Co., Ltd.) at liquid pressure of 0.2 MPa and air pressure of 0 MPa.

The water in the resin-added sheet material (precursor sheet) was dried well using a blower dryer at 80° C.

Hot pressing was conducted under conditions of temperature at 180° C. and time for 3 minutes.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 28

A porous electrode substrate was obtained by the same process as in example 27 except for the following:

The completely dewatered sheet material above was entangled the same as in example 23, where water-jetting pressures were set at 2 MPa (nozzle 1), 2 MPa (nozzle 2) and 2 MPa (nozzle 3).

As a method for adding resin, a vortex-flow atomization nozzle (brand name: AM45, made by Atomax) was used to spray resin onto the three-dimensionally entangled-structure sheet by a liquid suction method at air pressure of 0.2 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

Example 29

A porous electrode substrate was obtained by the same process as in example 8 except for the following:

A sheet material was not entangled, and step [2] for adding resin was conducted on a sheet material completely dewatered by using a dewatering apparatus under reduced pressure.

A resol-type phenolic resin water dispersion (brand name: PR-55464, made by Sumitomo Bakelite Co., Ltd.) was used for adding resin, and the resin solid content in the resin-containing solution was set at 15% by mass.

The resin-containing solution was dripped onto the completely dewatered sheet material using a double-tube spray valve (brand name: BP-107DN-SP, made by Ace-Giken Co., Ltd.) at liquid pressure of 0.2 MPa and air pressure of 0 MPa.

The obtained porous electrode substrate showed no surface contraction caused by heat treatment, the undulation of the sheet was small at less than 2 mm, and the gas permeability, thickness and through-plane resistance were each excellent. The composition of the porous electrode substrate and the evaluation results are shown in Table 3.

TABLE 3

| | | | Example | | | | | |
|---|---|---|---|---|---|---|---|---|
| | | | 15 | 16 | 17 | 18 | 19 | 20 |
| Sheet material | Short carbon fiber (A) | part by mass | 50 | 60 | 80 | 50 | 60 | 80 |
| | Short carbon fiber precursor (b1) | part by mass | 30 | 20 | 10 | 30 | 20 | 10 |
| | Fibrillar fiber (b2) (b2-1)*[1] | part by mass | 20 | — | 10 | 20 | — | 10 |
| | (b2-2)*[2] | part by mass | — | 20 | — | — | 20 | — |
| | Basis weight of sheet material | g/m$^2$ | 42 | 43 | 42 | 42 | 43 | 43 |
| | Nozzle 1, 2, 3: water-injection pressure | MPa | 1.2.1 | 1.2.1 | 1.2.1 | 1.2.1 | 1.2.1 | 1.2.1 |
| Precursor sheet | Phenolic resin (brand name) | | PR55464 | PR14170 | PR50781 | PR14170 | PR50781 | PR55464 |
| | Solid content of phenolic resin | % by mass | 10 | 10 | 10 | 15 | 15 | 15 |
| | Method for applying resin | | S1 | S2 | S3 | S3 | S1 | S2 |
| | Basis weight of precursor sheet | g/m$^2$ | 78 | 73 | 73 | 94 | 92 | 89 |
| | Sodium content | mg/m$^2$ | 7 | 4 | 3 | 7 | 4 | 3 |
| | Hot-pressing method | | batch | batch | batch | batch | batch | batch |
| | Hot-pressing temperature | degree C. | 150 | 180 | 200 | 180 | 200 | 150 |
| | Preheat time before hot pressing | | none | none | none | none | none | none |
| | Hot-pressing pressure | MPa | 3.0 | 4.5 | 6.0 | 6.0 | 3.0 | 4.5 |
| | Hot-pressing time | | 1 min | 1 min | 1 min | 1 min | 1 min | 1 min |
| Porous electrode substrate | Basis weight | g/m$^2$ | 43 | 45 | 52 | 54 | 56 | 59 |
| | Bulk density | g/cm$^3$ | 0.25 | 0.29 | 0.35 | 0.38 | 0.38 | 0.41 |
| | Gas permeability | mL/hr/cm$^2$/Pa | 1700 | 2000 | 1900 | 1300 | 2200 | 2000 |
| | Through-plane resistance | mohm · cm$^2$ | 5.0 | 4.8 | 4.9 | 4.4 | 4.6 | 4.6 |
| | Bending stiffness MD | g · cm | 7.2 | 16.3 | 19.1 | 5.8 | 15.5 | 21.8 |
| | Bending stiffness TD | g · cm | 4.5 | 8.7 | 8.0 | 3.6 | 9.4 | 6.4 |
| | Sheet condition after being pressed at 3 MPa | | ○ | ○ | ○ | ○ | ○ | ○ |
| | Initial thickness | micron | 170 | 157 | 149 | 144 | 148 | 145 |
| | Thickness at 3 MPa/Initial thickness x | % | 53 | 69 | 50 | 68 | 61 | 66 |
| | Thickness after pressure test/initial thickness × 100 | % | 85 | 93 | 84 | 91 | 90 | 90 |
| | undulation | mm | <2 | <2 | <2 | <2 | <2 | <2 |

| | | | Example | | | | | |
|---|---|---|---|---|---|---|---|---|
| | | | 21 | 22 | 23 | 27 | 28 | 29 |
| Sheet material | Short carbon fiber (A) | part by mass | 50 | 60 | 80 | 80 | 80 | 40 |
| | Short carbon fiber precursor (b1) | part by mass | 30 | 20 | 10 | — | — | 40 |
| | Fibrillar fiber (b2) (b2-1)*[1] | part by mass | 20 | — | 10 | 20 | 20 | 20 |
| | (b2-2)*[2] | part by mass | — | 20 | — | — | — | — |
| | Basis weight of sheet material | g/m$^2$ | 42 | 43 | 42 | 70 | 69 | 40 |
| | Nozzle 1, 2, 3: water-injection pressure | MPa | 1.2.1 | 1.2.1 | 1.2.1 | — | 2.2.2 | — |
| Precursor sheet | Phenolic resin (brand name) | | PR50781 | PR55464 | PR14170 | PR55464 | PR55464 | PR55464 |
| | Solid content of phenolic resin | % by mass | 10 | 10 | 10 | 15 | 15 | 15 |
| | Method for applying resin | | S3 | S1 | S2 | S3 | S2 | S3 |
| | Basis weight of precursor sheet | g/m$^2$ | 90 | 87 | 96 | 115 | 100 | 78 |
| | Sodium content | mg/m$^2$ | 7 | 4 | 3 | 3 | 3 | 8 |
| | Hot-pressing method | | batch | batch | batch | batch | batch | batch |
| | Hot-pressing temperature | degree C. | 150 | 180 | 200 | 180 | 180 | 180 |
| | Preheat time before hot pressing | | none | none | none | none | none | 1 min |
| | Hot-pressing pressure | MPa | 4.5 | 6.0 | 3.0 | 3.0 | 3.0 | 6 |
| | Hot-pressing time | | 1 min | 1 min | 1 min | 3 min | 3 min | 3 min |
| Porous electrode substrate | Basis weight | g/m$^2$ | 52 | 51 | 65 | 66 | 61 | 28 |
| | Bulk density | g/cm$^3$ | 0.37 | 0.40 | 0.41 | 0.30 | 0.31 | 0.23 |
| | Gas permeability | mL/hr/cm$^2$/Pa | 1600 | 1900 | 2200 | 2300 | 2500 | 1500 |
| | Through-plane resistance | mohm · cm$^2$ | 4.5 | 4.6 | 4.5 | 9.5 | 6.7 | 8.9 |
| | Bending stiffness MD | g · cm | 13.5 | 15.2 | 18.1 | 5.2 | 12.8 | 6.0 |
| | Bending stiffness TD | g · cm | 7.7 | 8.4 | 8.6 | 3.5 | 5.4 | 3.3 |
| | Sheet condition after being pressed at 3 MPa | | ○ | ○ | ○ | ○ | ○ | ○ |
| | Initial thickness | micron | 140 | 129 | 158 | 223 | 198 | 122 |
| | Thickness at 3 MPa/Initial thickness x | % | 55 | 59 | 63 | 70 | 45 | 67 |

TABLE 3-continued

| | | | | | | | |
|---|---|---|---|---|---|---|---|
| Thickness after pressure test/initial thickness × 100 | % | 84 | 83 | 87 | 94 | 69 | 92 |
| undulation | mm | <2 | <2 | <2 | <2 | <2 | <2 |

*[1](b2-1): polyacrylonitrile-based pulp with numerous branched fibrils
*[2](b2-2): fibrils made by beatingre a splittable acrylic sea-island composite short fiber consisting of cellulose acetate and an acrylic polymer.
*3) Method for applying resin S1: spray by double-tube nozzle S2: spray by vortex-flow nozzle S3: drip by double-tube nozzle

DESCRIPTION OF NUMERICAL REFERENCES

A: short carbon fibers (A)
B: carbon fibers (B)
C: resin carbide (C)
1: parallel line to sheet surface.

The invention claimed is:

1. A porous electrode substrate, comprising a structure in which short carbon fibers (A) are bonded by a resin carbide (C) derived from a water-soluble phenolic resin and a water-dispersible phenolic resin,
   wherein the short carbon fibers (A) form a three-dimensional entangle structure in the porous electrode substrate.

2. A porous electrode substrate, comprising a structure in which short carbon fibers (A) are bonded by carbon fibers (B) and resin carbide (C),
   wherein the carbon fibers (B) are derived from carbon fiber precursor short fibers (b1), fibrillar fibers (b2), or both,
   the resin carbide (C) is derived from a water-soluble phenolic resin and water-dispersible phenolic resin, and
   the short carbon fibers (A) form a three-dimensionally entangled structure in the porous electrode substrate.

3. The porous electrode substrate of claim 1,
   wherein
   the porous electrode substrate has a bulk density of from 0.20 g/cm3 to 0.45 g/cm3 and a thickness at 3 MPa pressure of from 30% to 70% of a thickness at 0.05 MPa pressure.

4. The porous electrode substrate according to claim 3, wherein the porous electrode substrate has a thickness after being pressed at 3 MPa and decompressed to 0.05 MPa of from 60% to 98% of an initial thickness at 0.05 MPa pressure.

5. The porous electrode substrate according to claim 2,
   wherein the porous electrode substrate has a bulk density of from 0.20 g/cm$^3$ to 0.45 g/m$^3$ and a thickness at 3 MPa pressure of from 30% to 70% of a thickness at 0.05 MPa pressure.

6. The porous electrode substrate according to claim 2, wherein the electrode substrate has a bulk density of from 0.20 g/cm$^3$ to 0.45 g/cm$^3$, a thickness at 3 MPa pressure of from 30% to 70% of an initial thickness at 0.05 MPa pressure, and a thickness after being pressed at 3 MPa and decompressed to 0.05 MPa of from 60% to 98% of the initial thickness.

7. A membrane-electrode assembly, comprising the porous electrode substrate according to claim 1.

8. A method for manufacturing the porous electrode substrate of claim 1, the method comprising:
   manufacturing a sheet material in which short carbon fibers (A) are dispersed;
   adding a water-soluble phenolic resin and a water-dispersible phenolic resin, to the sheet material, thereby forming a precursor sheet; and
   carbonizing the precursor sheet at a temperature of 1000° C. or higher.

9. The method according to claim 8, further comprising:
   entangling the sheet material between the manufacturing and the adding.

10. The method according to claim 8, further comprising:
    drying the sheet material between the manufacturing and the adding.

11. The method according to claim 9, further comprising:
    drying the sheet material between the manufacturing and the entangling, the entangling and the adding, or both.

12. The method according to claim 8,
    wherein the manufacturing is manufacturing a sheet material in which short carbon fibers (A) along with carbon fiber precursor short fibers (b1), fibrillar fibers (b2), or both are dispersed.

13. The method according to claim 8, further comprising:
    hot pressing the precursor sheet at a temperature of from 100° C. to 250° C. between the adding and the carbonizing.

14. The method according to claim 13, further comprising:
    drying the precursor sheet between the adding and the hot pressing.

15. The method according to claim 8,
    wherein the sheet material obtained during the manufacturing comprises a water-soluble binder, and
    an amount of the water-soluble binder in the sheet material is 10 g/m2 or less.

16. The method according to claim 8, wherein the adding is adding the water-soluble phenolic resin, water-dispersible phenolic resin, or both to the sheet material by spraying, dripping, or flowing.

* * * * *